June 5, 1945. B. W. FRY 2,377,413
VENDING MACHINE
Filed May 5, 1941 17 Sheets-Sheet 1
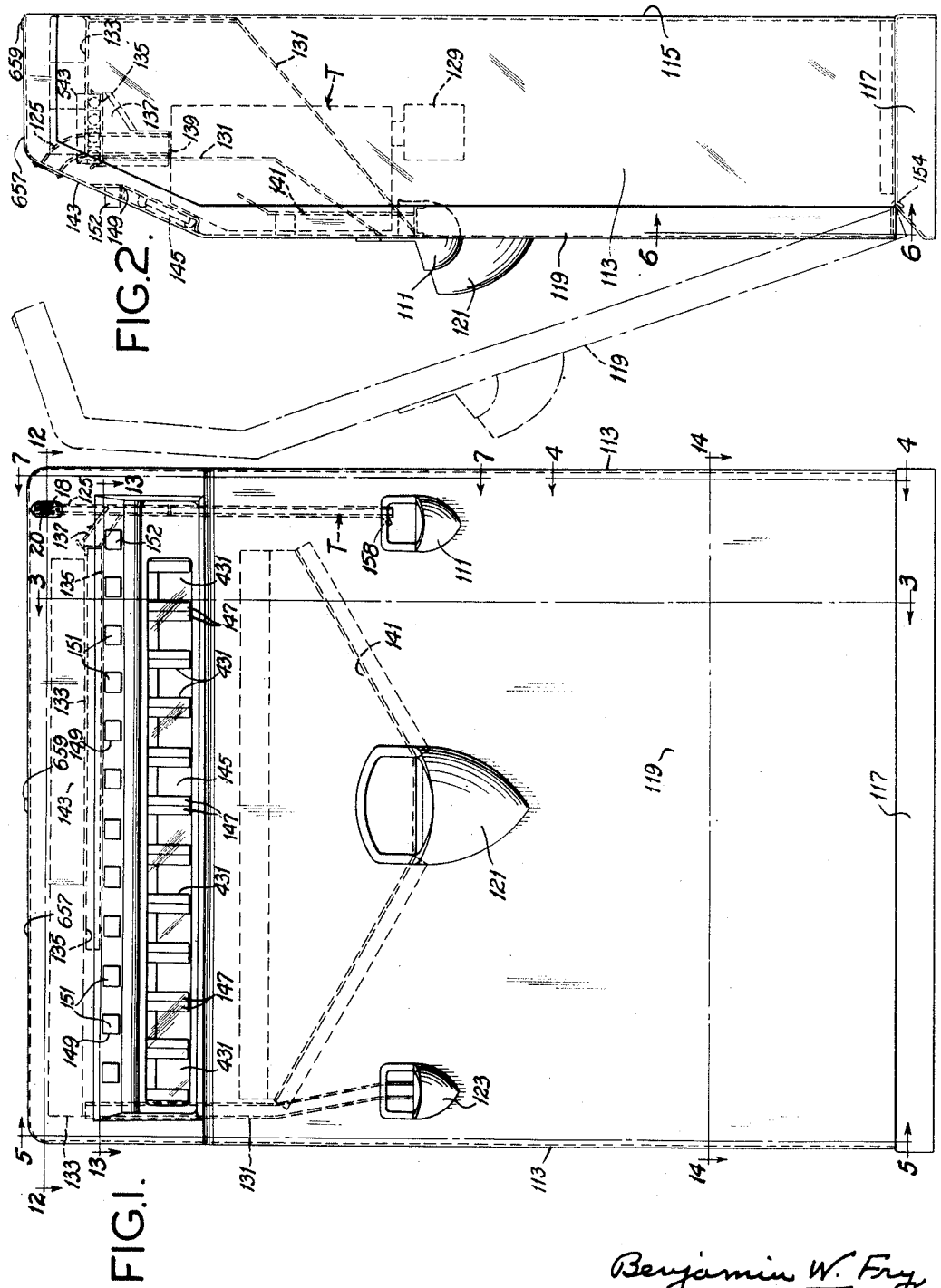

June 5, 1945. B. W. FRY 2,377,413
VENDING MACHINE
Filed May 5, 1941 17 Sheets-Sheet 2
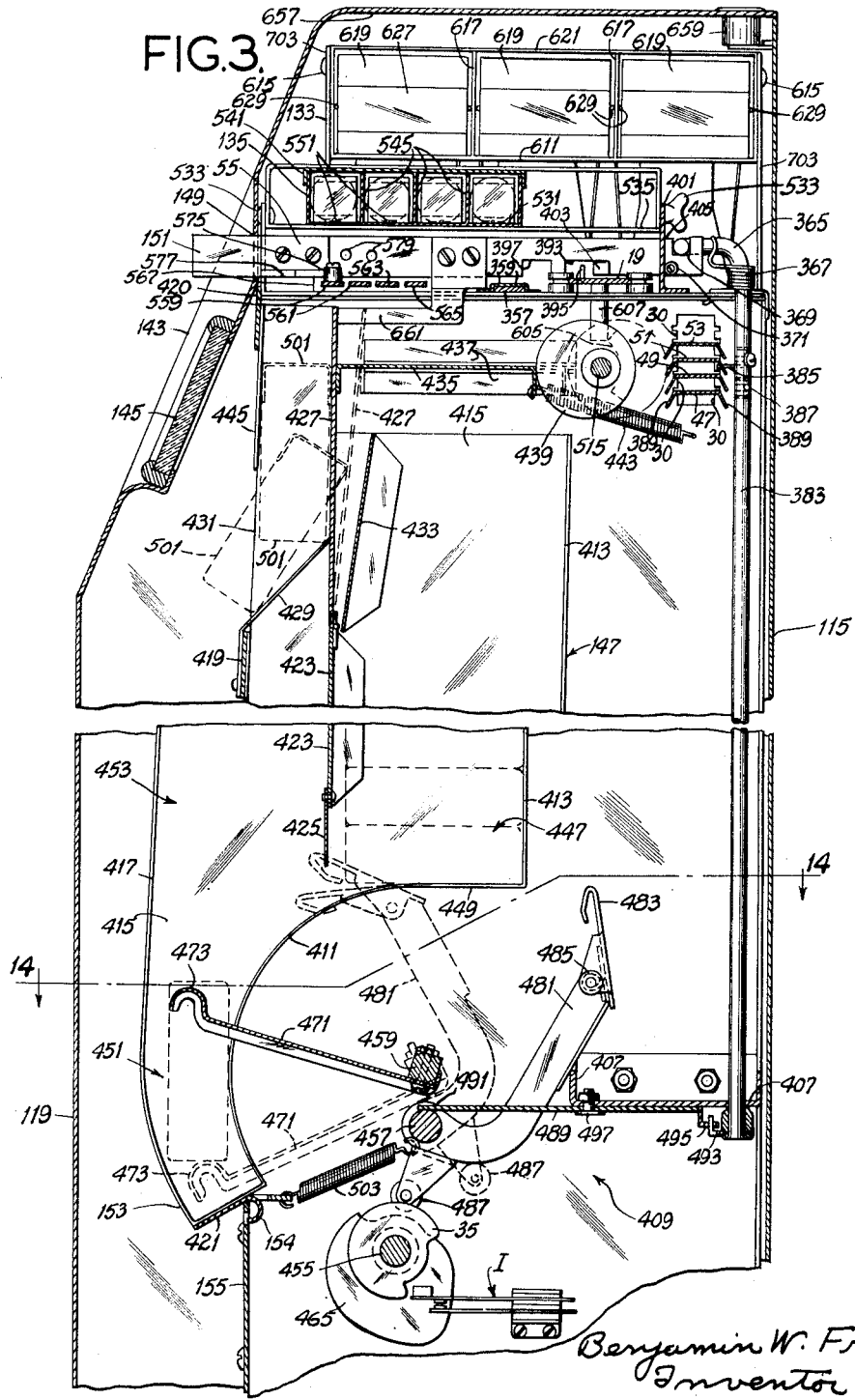

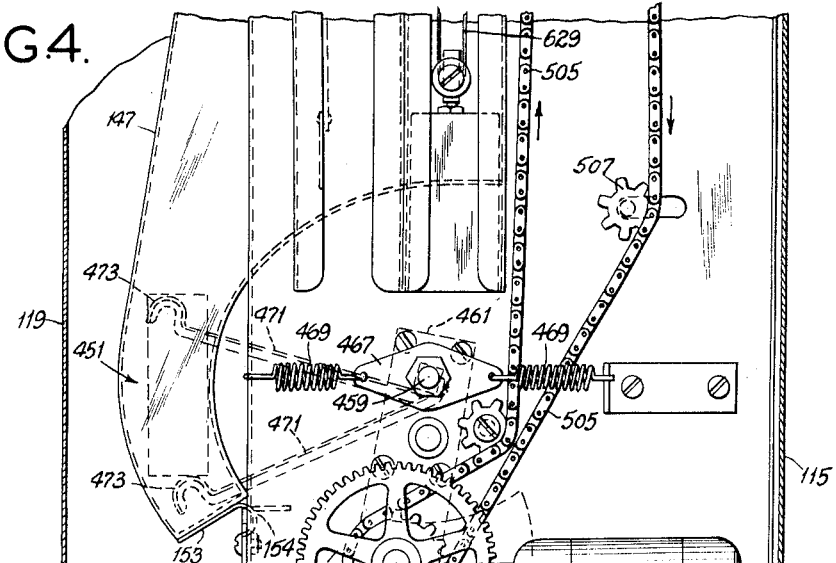
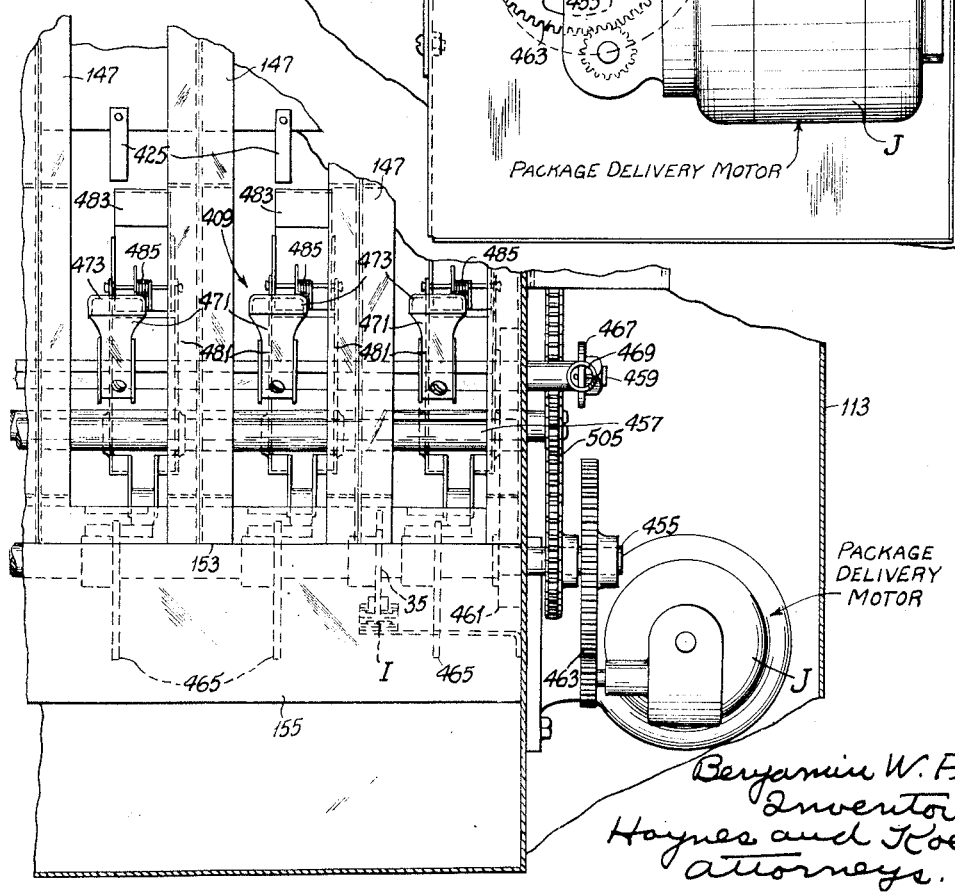

June 5, 1945.  B. W. FRY  2,377,413
VENDING MACHINE
Filed May 5, 1941  17 Sheets-Sheet 4
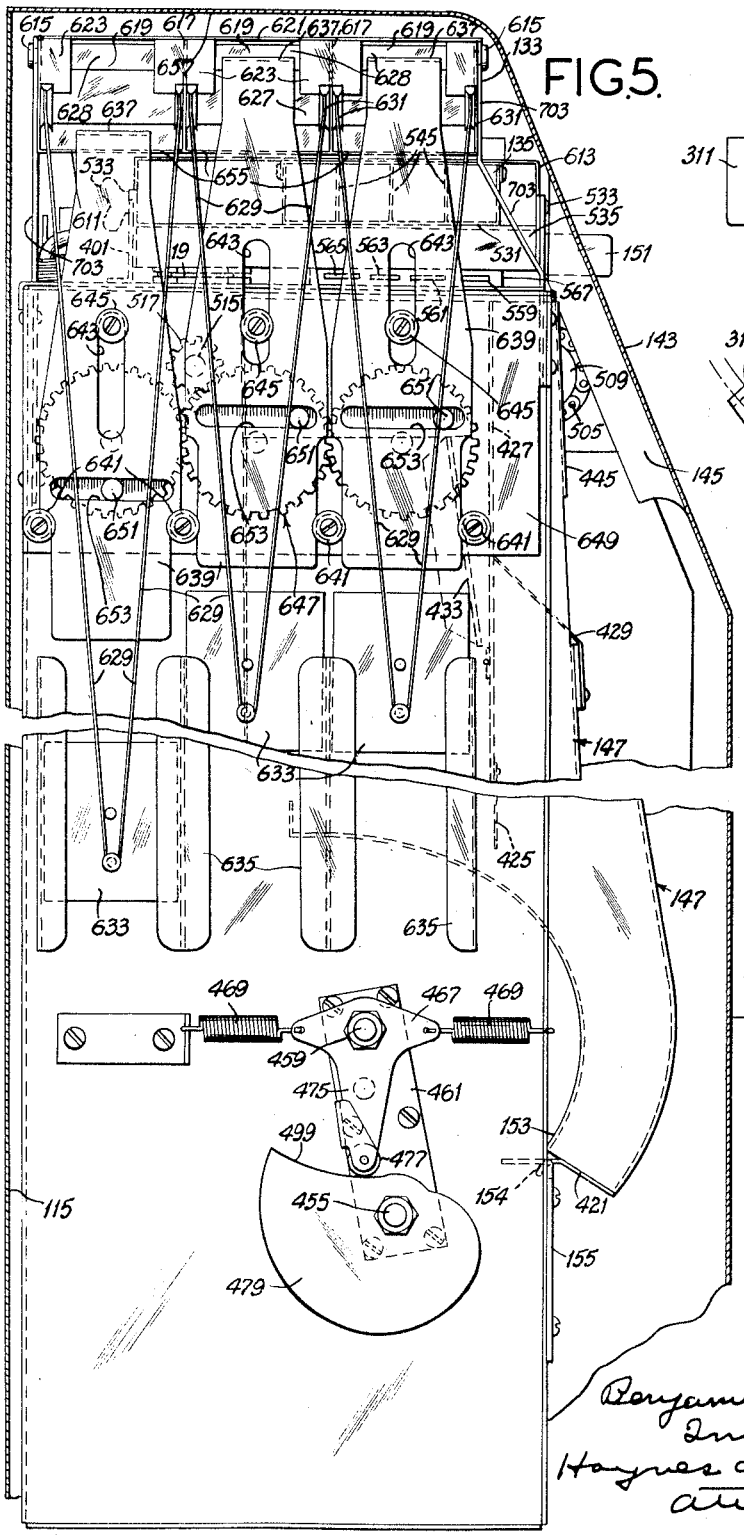

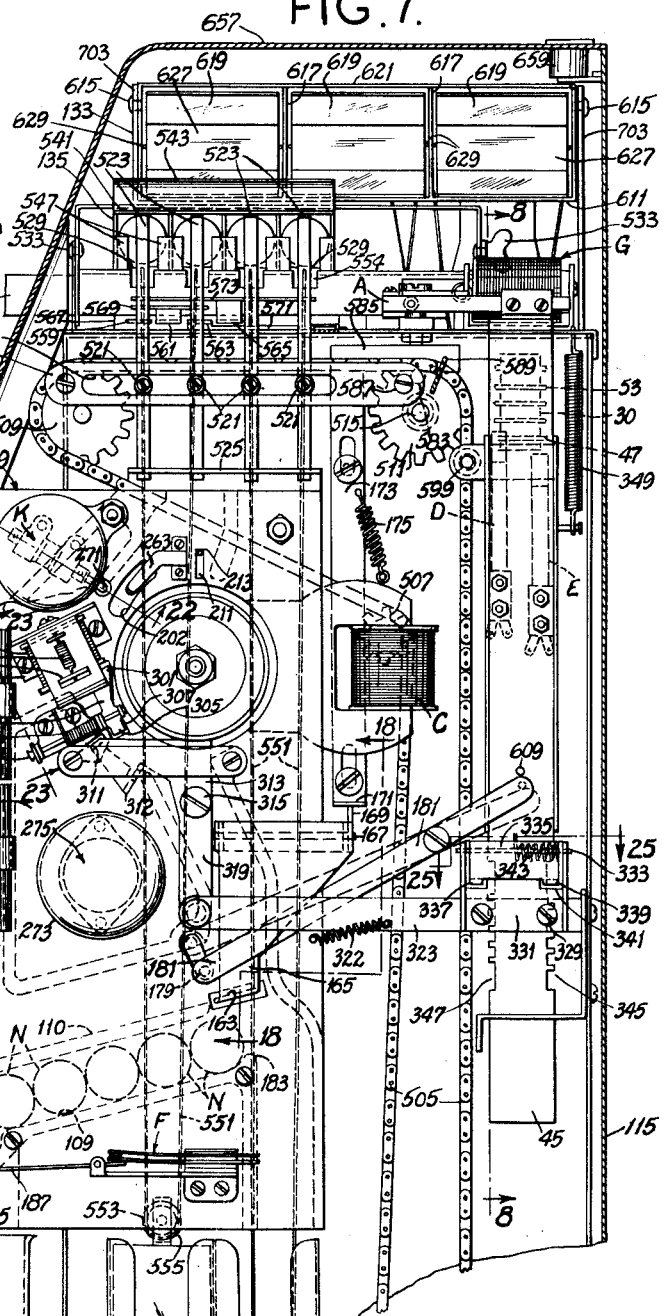

June 5, 1945. B. W. FRY 2,377,413
VENDING MACHINE
Filed May 5, 1941 17 Sheets-Sheet 6
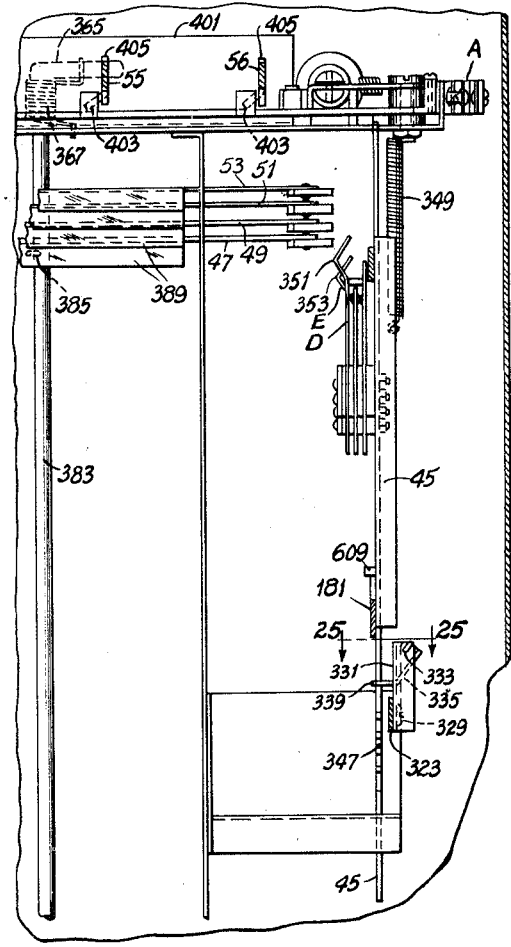
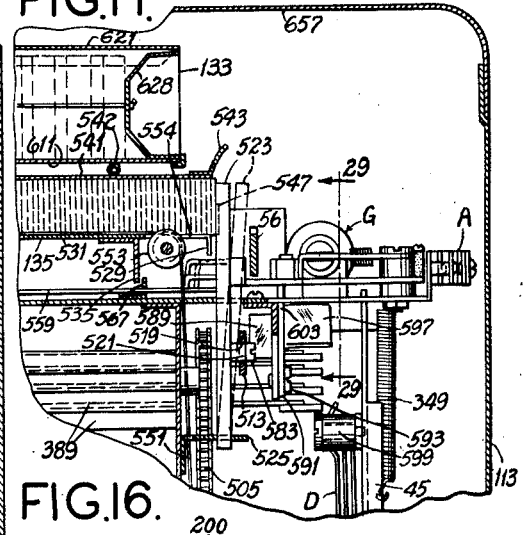
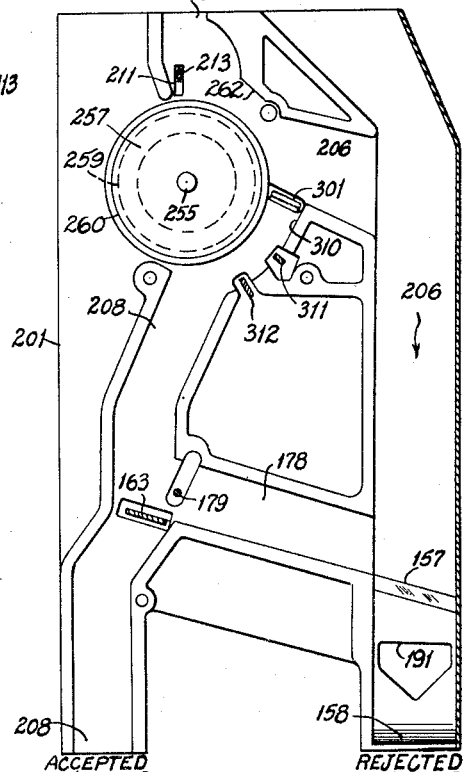
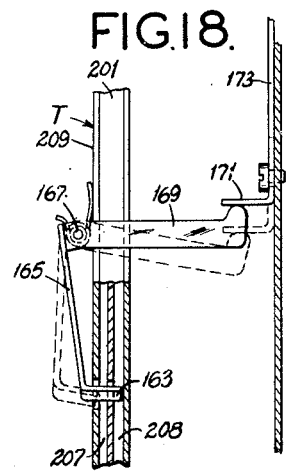
Benjamin W. Fry,
Inventor.
Haynes and Koenig,
Attorneys.

June 5, 1945. B. W. FRY 2,377,413
VENDING MACHINE
Filed May 5, 1941 17 Sheets-Sheet 7
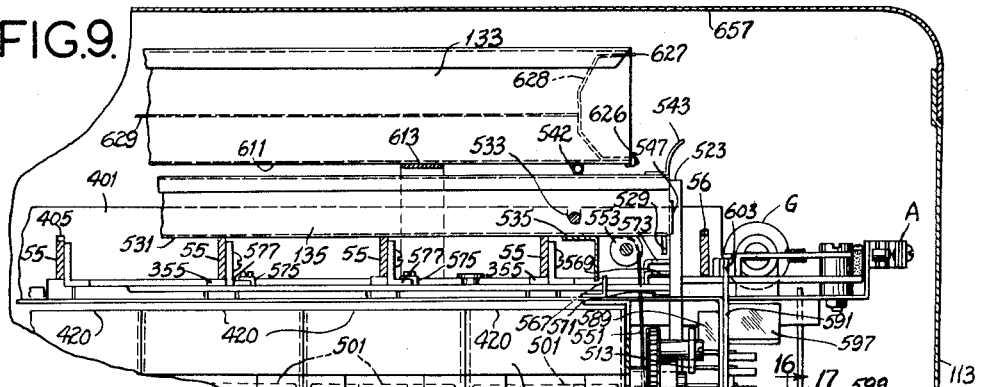
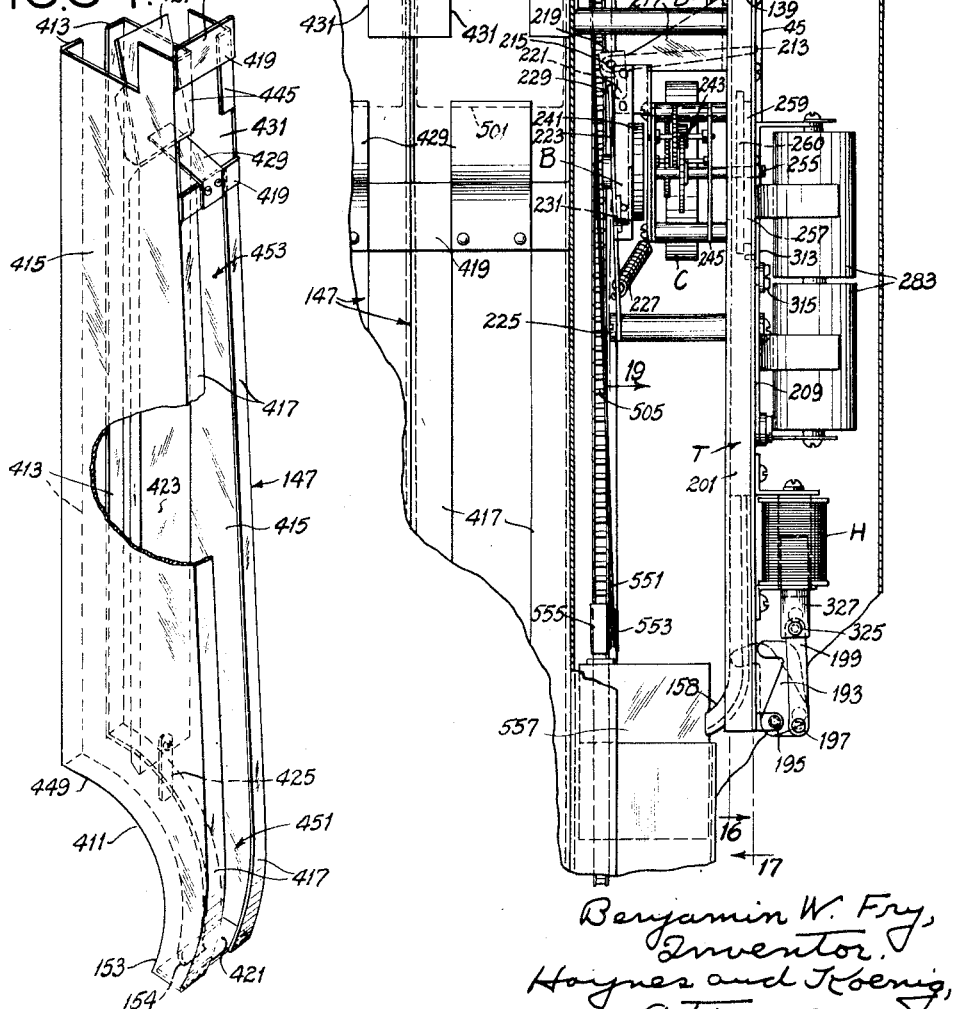
Benjamin W. Fry,
Inventor.
Haynes and Koenig,
Attorneys.

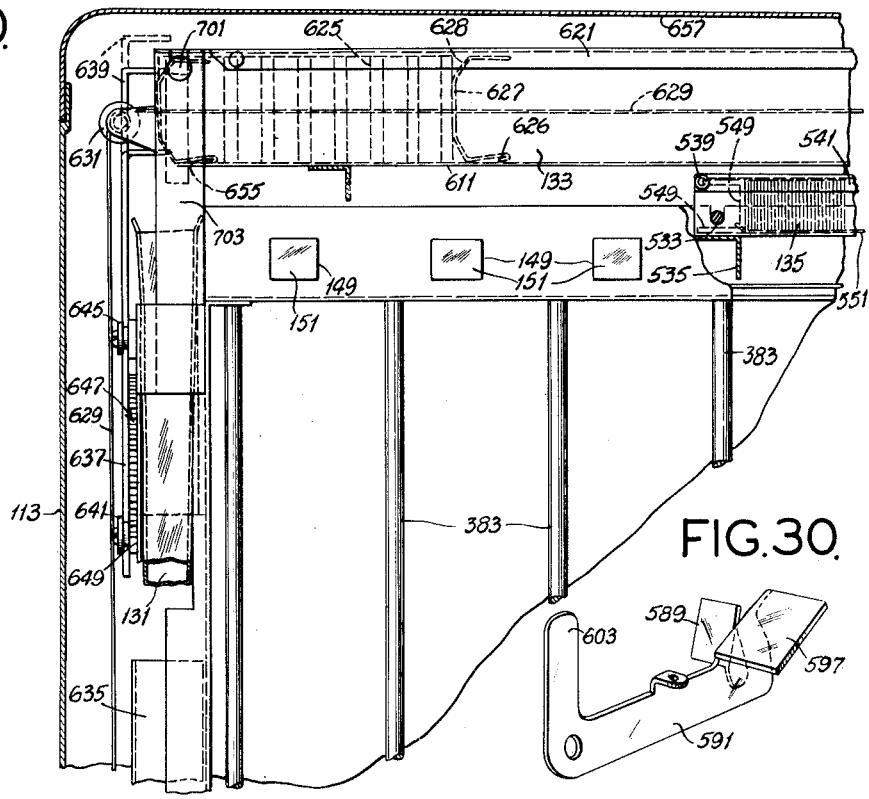
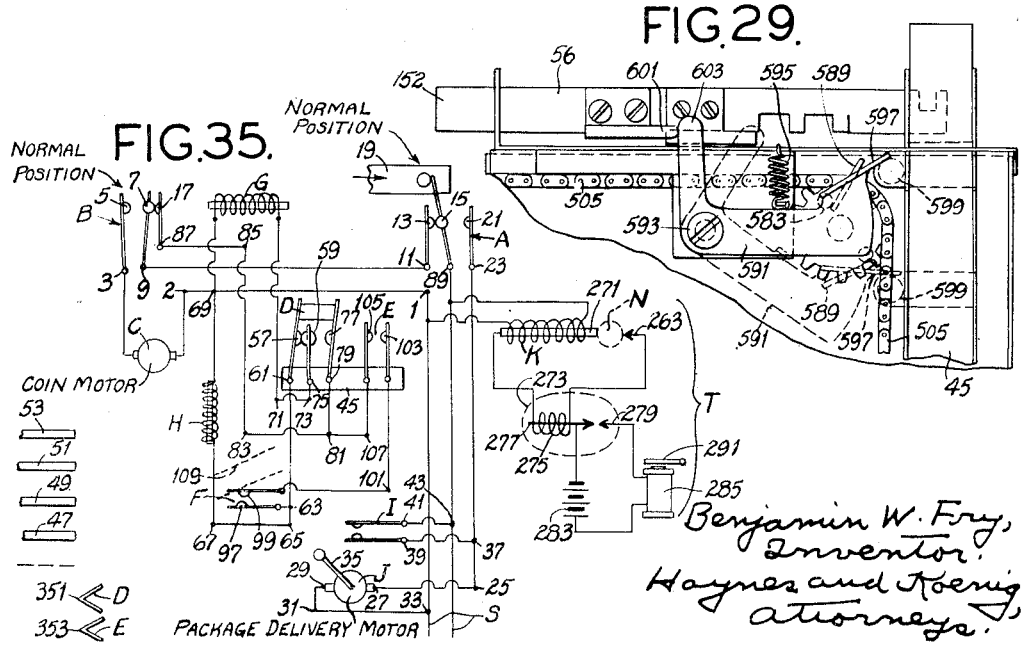

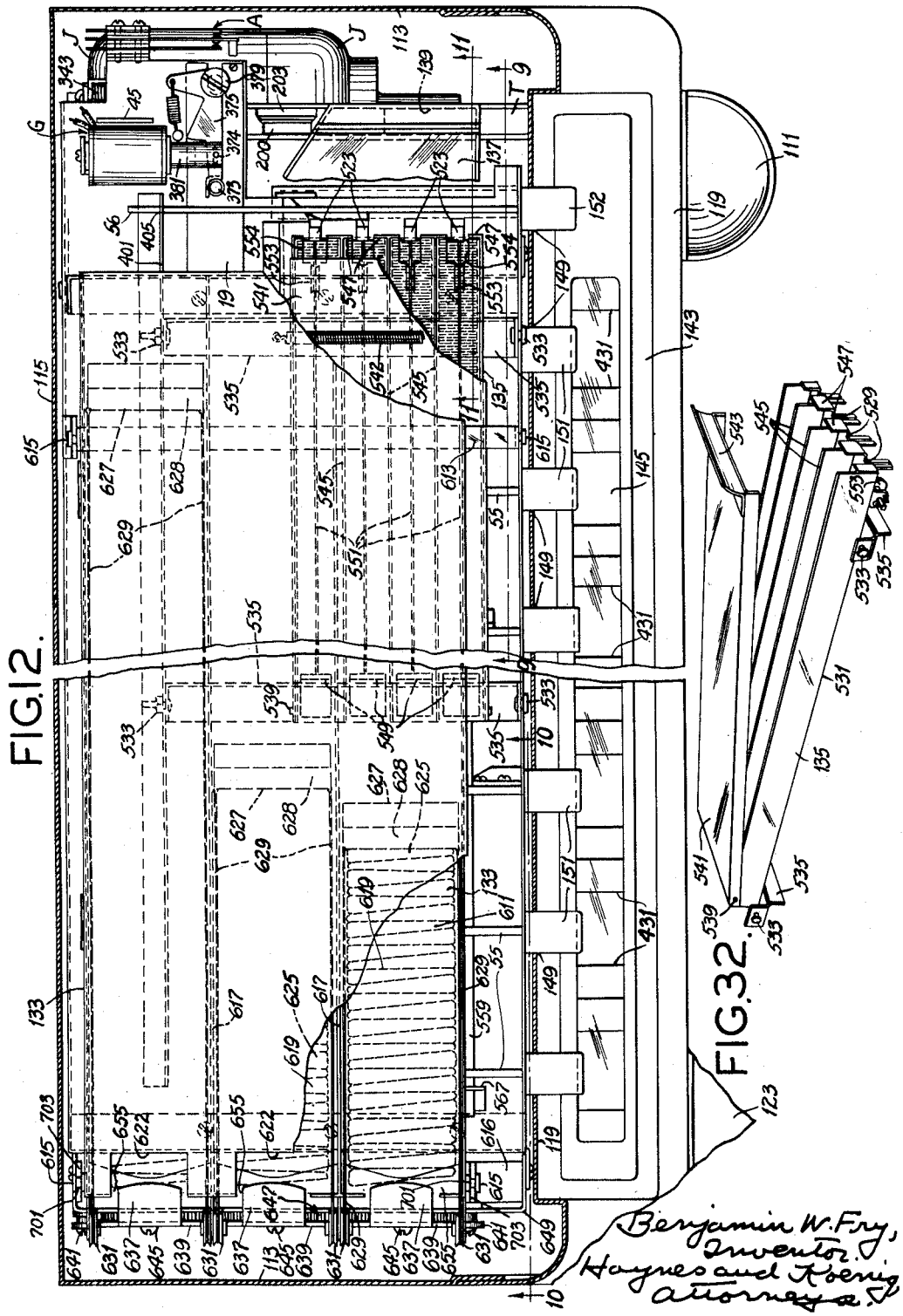

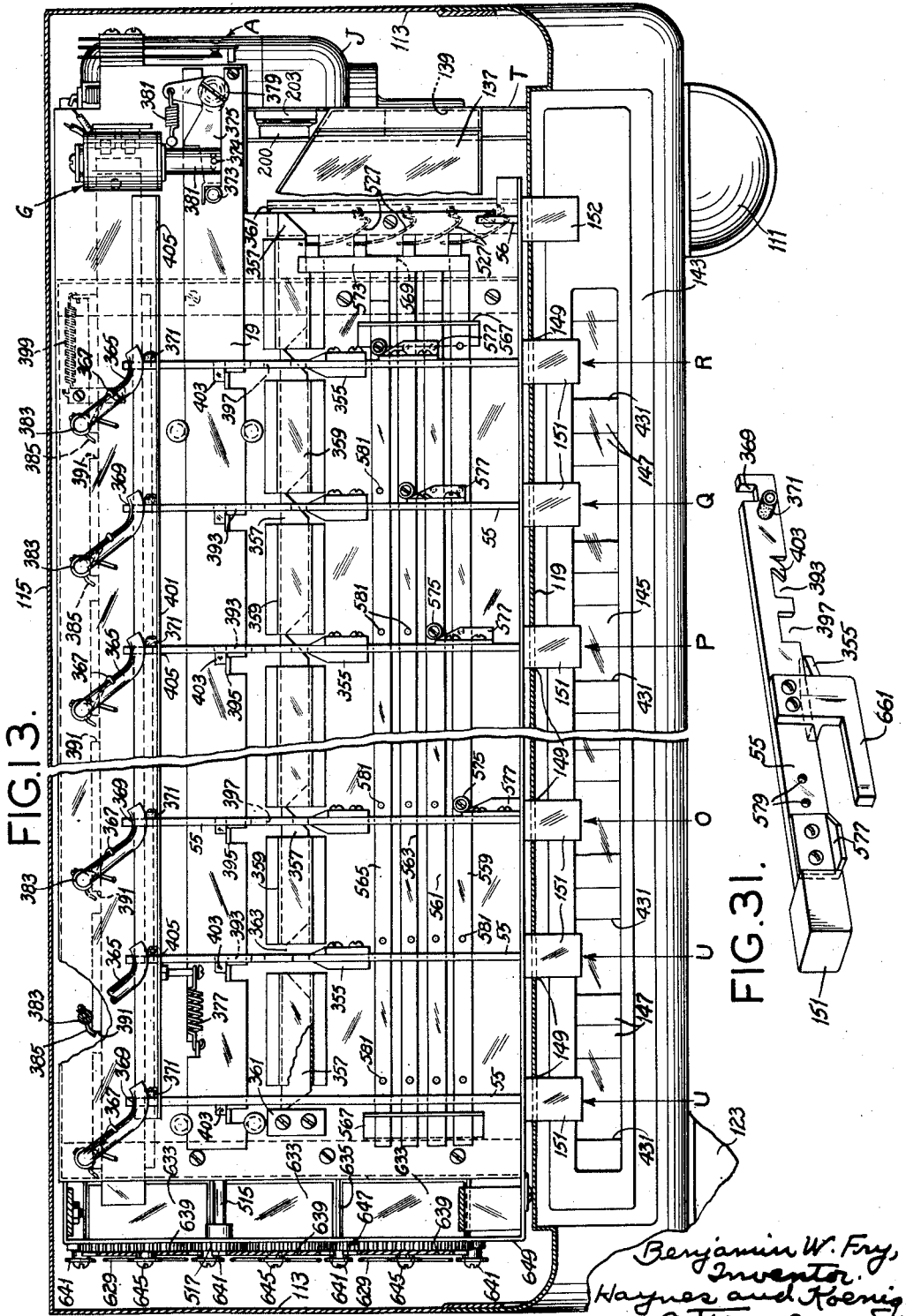

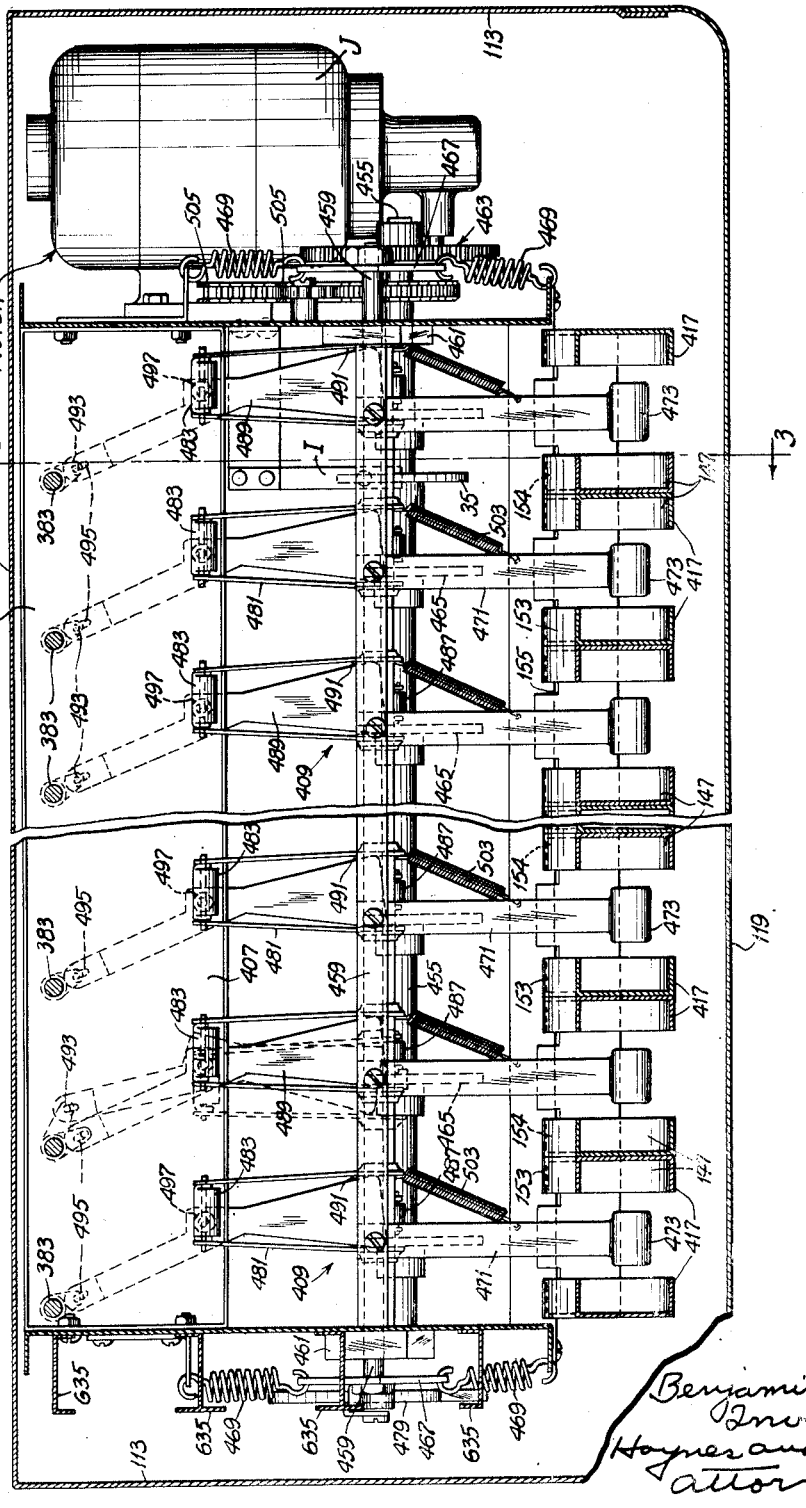

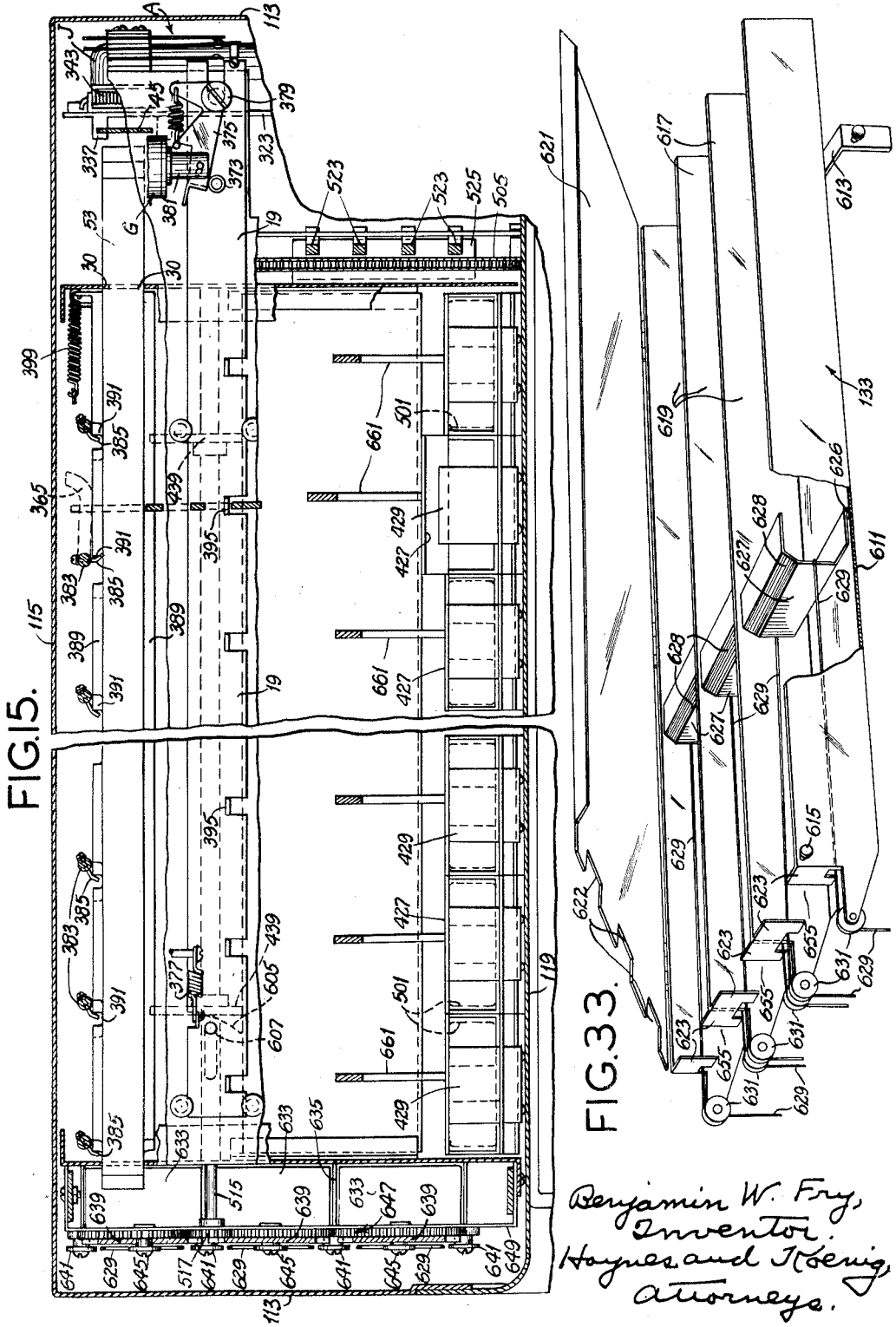

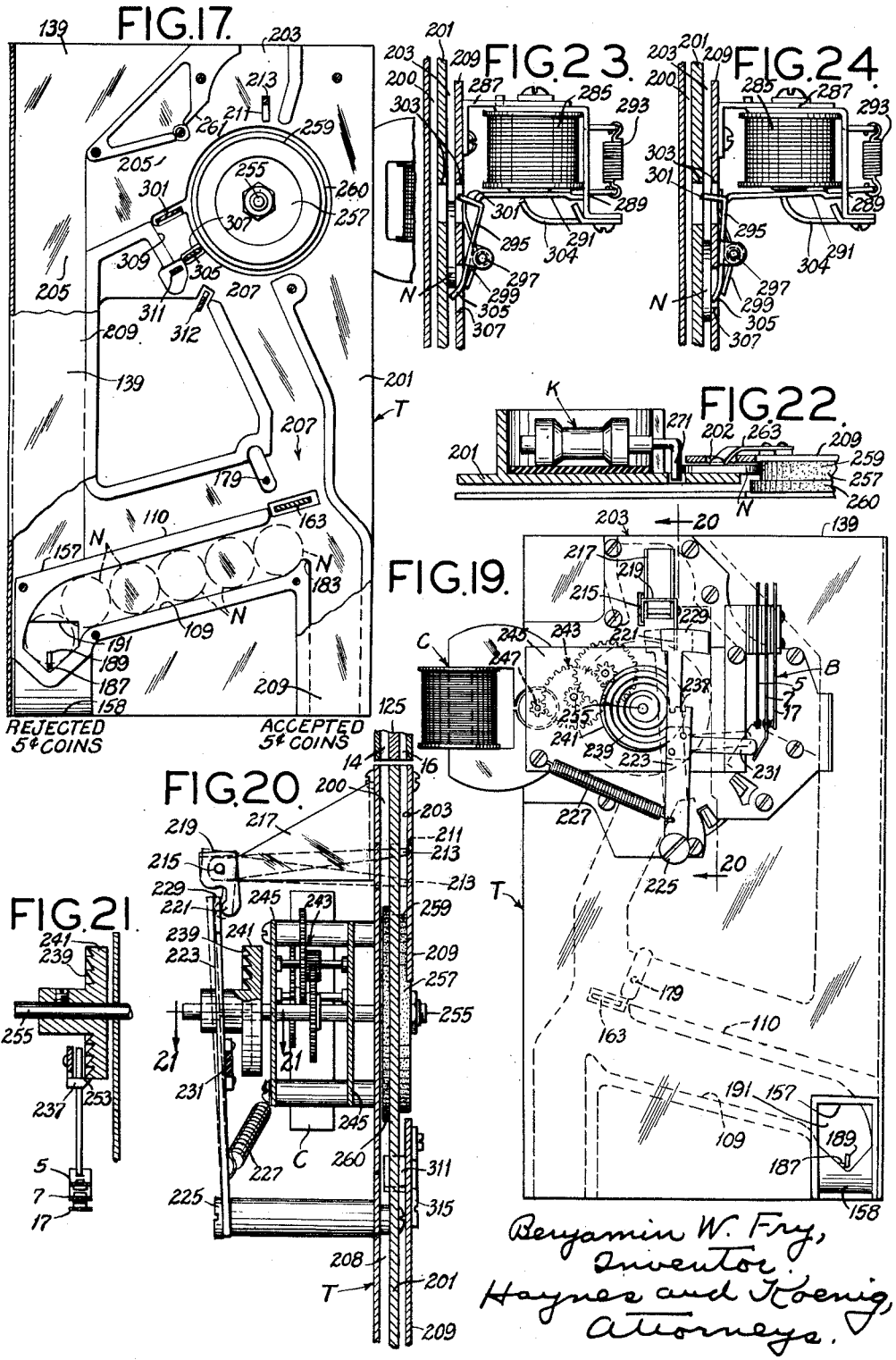

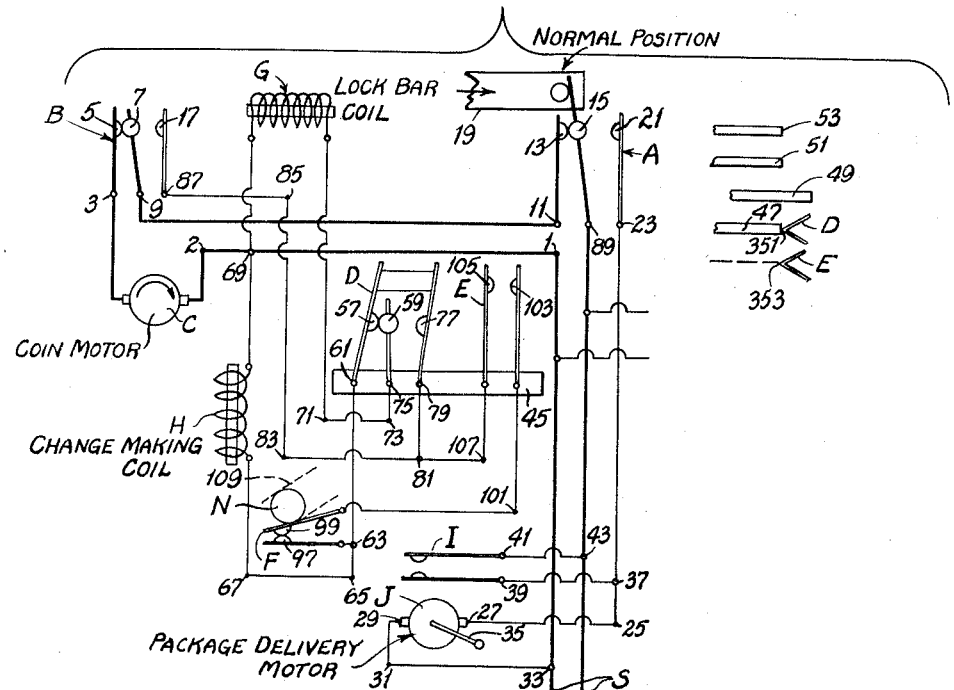

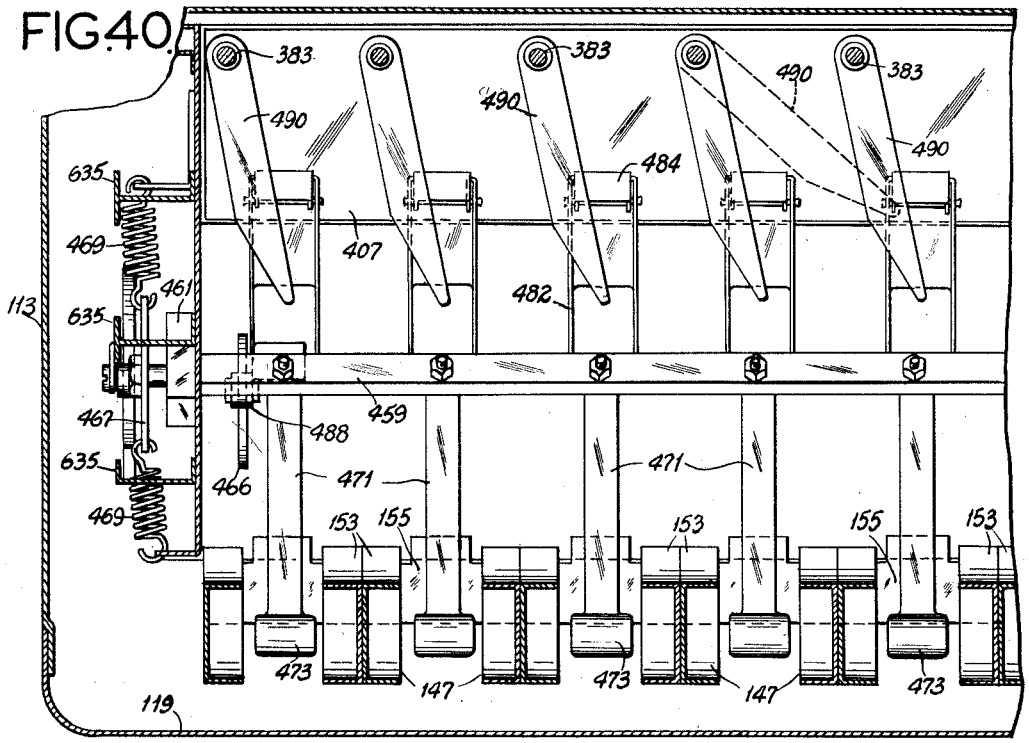
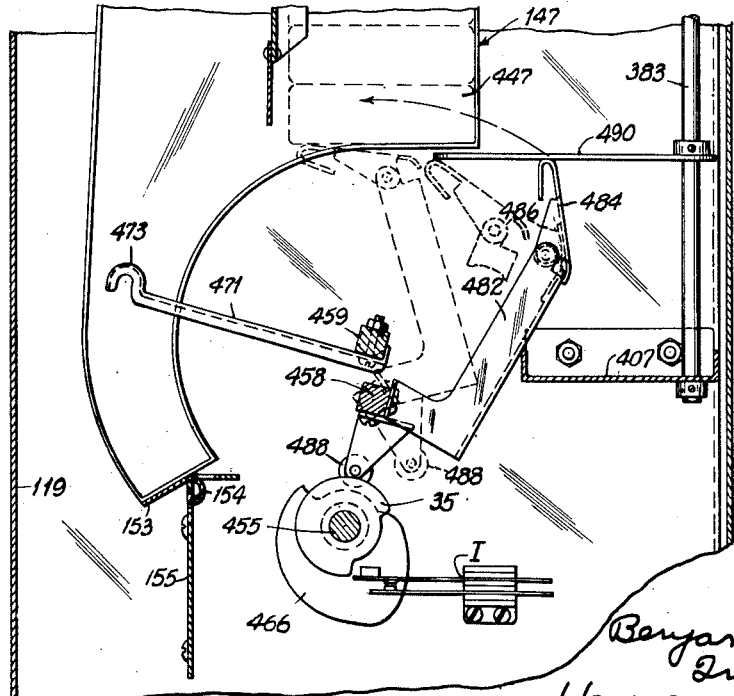

June 5, 1945.  B. W. FRY  2,377,413

VENDING MACHINE

Filed May 5, 1941  17 Sheets-Sheet 17

Benjamin W. Fry,
Inventor.
Haynes and Koenig
Attorneys.

Patented June 5, 1945

2,377,413

UNITED STATES PATENT OFFICE 2,377,413

VENDING MACHINE

Benjamin W. Fry, University City, Mo.

Application May 5, 1941, Serial No. 391,907

45 Claims. (Cl. 194—10)

This invention relates to vending machines generally, and with regard to certain more specific features, to vending machines for cigarette packages and the like.

Among the several objects of the invention may be noted the provision in a vending machine of the class described having the following characteristics:

A compact, relatively simple, arrangement having a large capacity for cigarette packages, match books, and change; which provides for vending cigarette packages at various prices up to 25¢ by one-cent differences, along with match books and for returning necessary penny and other change; and which will return all moneys which do not result in the delivery of a desired package.

The provision of a machine of the above class which does not require preloading of change or matches into the vended packages per se, as heretofore, the change and matches being carried in the machine in a novel and compact manner.

The provision of a vending machine of the class described in which change is made in denominations of nickels and pennies, the latter usually, though not necessarily, being required by additions to cost brought about by taxes; and which will return up to 9¢ change as one nickel and four pennies, thereby covering all change-making requirements of the machine, but assuring that no ordinary scheme of operation for defrauding the machine can before detection result in extraction of any substantial amount.

The provision of a widely adaptable vending machine of the class described, in which adjustments for various amounts of penny change (the kind that varies widely in view of tax requirements) can be readily made at the time of servicing, and one in which said penny change is made in such a way that the pennies (which may be somewhat deformed) are not required to go through the other coin-handling apparatus employed, thus simplifying the construction, even though penny change-making operations may be accomplished for all 1¢, 2¢, 3¢ and 4¢ values.

The provision of a vending machine of the class described which will handle cigarette packages of any popular sizes and prices, including both standard and long lengths of twenty-cigarette and twenty-four-cigarette packages.

The provision of apparatus of the class described which, with all of its advantageous multiple effects may be operated by the purchaser as, or more, easily than prior vending machines, having a short cycle of operation and delivering a package to the purchaser at the beginning of the operating cycle, thus saving the purchaser's time and accommodating more sales in a shorter period.

And the provision of apparatus of the class described which may be easily reloaded and serviced.

Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which are illustrated several of various possible embodiments, Fig. 1 is a front elevation on a reduced scale;

Fig. 2 is a side elevation showing in dotted lines a partially removed position of a front panel;

Fig. 3 is a vertical section taken on lines 3—3 of Figs. 1 and 14;

Fig. 4 is a vertical section taken on line 4—4 of Fig. 1;

Fig. 5 is a vertical section taken on line 5—5 of Fig. 1;

Fig. 6 is a fragmentary vertical section taken on line 6—6 of Fig. 2;

Fig. 7 is a vertical section taken on line 7—7 of Fig. 1;

Fig. 8 is a vertical section taken on line 8—8 of Fig. 7;

Fig. 9 is a vertical section taken on line 9—9 of Fig. 12;

Fig. 10 is a vertical section taken on line 10—10 of Fig. 12;

Fig. 11 is a vertical section taken on line 11—11 of Fig. 12;

Fig. 12 is a horizontal section taken on line 12—12 of Fig. 1, parts being broken away;

Fig. 13 is a horizontal section taken on line 13—13 of Fig. 1;

Fig. 14 is a horizontal section taken on lines 14—14 of Figs. 1 and 3;

Fig. 15 is a view similar to Fig. 13, but showing additional parts removed and an ultimate position of parts;

Fig. 16 is a vertical section taken on line 16—16 of Fig. 9;

Fig. 17 is a vertical section taken on line 17—17 of Fig. 9, looking in the opposite direction to Fig. 16;

Fig. 18 is a vertical detail section taken on line 18—18 of Fig. 7;

Fig. 19 is a vertical section taken on line 19—19 of Fig. 9, being like Fig. 16 with additional parts including a cover plate;

Fig. 20 is a vertical section taken on line 20—20 of Fig. 19;

Fig. 21 is a horizontal section taken on line 21—21 of Fig. 20;

Fig. 22 is a bias section taken on line 22—22 of Fig. 7;

Fig. 23 is a detailed section of a magnetic coin control, being taken on line 23—23 of Fig. 7;

Fig. 24 is a view similar to Fig. 23, showing an ultimate position of parts;

Fig. 25 is a horizontal section taken on line 25—25 of Figs. 7 and 8;

Fig. 26 is a horizontal section taken on line 26—26 of Fig. 25;

Fig. 27 is a vertical plan view of a counting lever;

Fig. 28 is a front elevation of Fig. 27;

Fig. 29 is a vertical section taken on line 29—29 of Fig. 11;

Fig. 30 is a perspective view of a lever forming part of Fig. 29;

Fig. 31 is a perspective view of a push rod;

Fig. 32 is a perspective view of a removable 1¢ change box with the cover shown partially open;

Fig. 33 is a fragmentary perspective view of a match supply box with the cover partially open;

Fig. 34 is a perspective view of a vertical delivery chamber and chute removed from the machine;

Fig. 35 is one form of wiring diagram shown in connection with a selector switch diagram, and showing the parts in a normal position when the machine is empty;

Fig. 36 is a view similar to Fig. 35 but enlarged, with switches reset for a 10¢ deposit and an attempted operation for a 15¢ purchase, the machine assumed to be loaded;

Fig. 37 is a view similar to Fig. 36, but showing the parts set for a 10¢ deposit and an operation for a 10¢ purchase;

Fig. 40 is a fragmentary horizontal section similar to Fig. 14 but showing an alternative construction in respect to the delivery mechanism;

Fig. 41 is a vertical section similar to the lower portion of Fig. 3, but corresponding to the alternative construction of Fig. 40;

Similar reference characters indicate corresponding parts throughout the several views of the drawings.

*Circuits and operation broadly considered*

Figure 38:
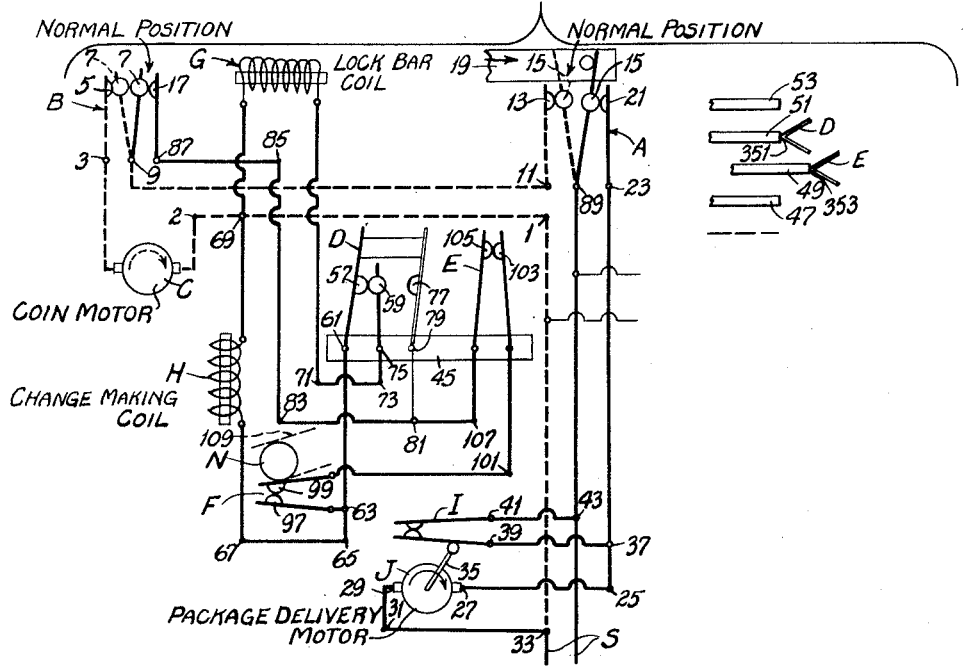
Fig. 38 is a view similar to Fig. 36, but showing the parts set for a 20¢ deposit and an operation for a 15¢ purchase, requiring return of 5¢ in change.

Broadly, the apparatus consists in certain features which may be most quickly comprehended from Figs. 35, 36, 37, 38 and 39. Supporting mechanical structure will be described later.

At S is shown a 110-volt supply line which is connected to the apparatus through a suitable plug or the like. Permanently connected across this supply circuit S is a heater coil K for a thermo-electric coin tester shown generally at T, which tests nickels (U. S. 5¢ pieces) for proper metallic constituents. This coin tester T is similar to the one shown in my co-pending United States patent application, Serial No. 344,011, filed July 5, 1940, for Coin-controlled apparatus, eventuated as United States Patent 2,361,835, dated October 31, 1944. Further particulars are shown in Figs. 19-24 herein, and will be elucidated.

This coin tester T, considered as mechanical apparatus, is associated with a coin-driving motor C which, during the coin test, drives the nickel coin N past the position shown in dotted lines in Fig. 35, and thereafter past a coin counter which will be described. These are the only two functions of the motor C. The motor C is energized from the supply circuit S over points 1, 2 (motor C), point 3, contacts 5 and 7 of a single pole, double throw switch B, and back to the circuit S, via points 9 and 11, and contacts 13, 15 of a second digit single pole double throw switch A. Hereinafter switch B will be known as a coin-motor switch and switch A as a lock-bar switch. The normal position of the pole 15 of the switch A is closed against contact 13 while the normal position of the pole 7 of said switch B is open from contact 5 and against the other contact 17 thereof. This condition is as shown in Fig. 35, wherein motor C is not operating.

The first switch to be operated, upon entry of a coin is coin motor switch B which, when a coin is inserted, moves to the position, shown for example in Fig. 36. This closes the circuit of motor C (shown in heavy lines) which operates the coin tester T to drive coins for testing and, or, counting.

The contacts 13, 15 of the lock bar switch A may be opened by operation of a lock bar 19 and when so opened, closure is effected by the contacts 15 and 21 of said switch A. This closure energizes a package delivery motor J through points 23, 37, 25, 27, 29, 31 and 33 (see Fig. 37). At this time the dotted-line circuit for coin motor C has re-opened.

When the motor J begins to rotate it operates a cam 35 which closes a switch I to maintain the motor energized until its desired cycle of operation has been completed, despite any reopening of contacts 15 and 21 of the switch A. The switch I completes a circuit 33, 31, 29, 27, 25, 37, 39, 41, 43, which is across the line S.

At D and E are shown two selector switches which are carried as a unit upon an escapement bar 45 which moves in response to operation of an escapement mechanism. The escapement mechanism (not shown on Figs. 35-39) in turn responds to operation of the coin counter operated from coin motor C. In Figs. 35-39, additional layouts at the sides show how the switches D and E are moved relatively to certain selector bars 47, 49, 51, 53.

Switches D and E, which move together, by counted steps move into apposition to the selector bars 47, 49, 51, 53. Switch D is a full-price selector switch; and E a change-making selector switch. Lower selector bar 47 is a so-called 10¢ bar; the next bar 49, a 15¢ bar; the next bar 51, a 20¢ bar; and the next bar 53, a 25¢ bar. These bars are respectively operated through suitable linkages to be described from push rods 55 (Fig. 31) respectively adjacent to compartments which carry the packages of different values, as for example, 10¢, 15¢, 20¢ and 25¢, respectively. When either switch D or E comes opposite a bar 47, 49,

51, 53 and the bar is shifted to the right, the respective switch is operated.

The normal position of full-price switch D is shown in Fig. 35, with contacts 57 and 59 closed. When these contacts 57 and 59 are closed, there is a circuit through points 61, 63, 65, 67, coil H, point 69, coil G, points 71, 73, and 75. The coils H and G are then deenergized.

Coil G is a solenoid coil for controlling lock bar switch A. A lock normally holds the lock bar 19 in the position to maintain contacts 13 and 15 closed. Under this condition contacts 15, 21 are open. When this lock bar coil G is energized, the lock unlocks bar 19, which becomes biased to the position for closing the contacts 15 and 21 of the lock bar switch A (contacts 13, 15 open).

When the switch D is thrown from the position shown in Fig. 36 to that shown in Fig. 37, in response to pushing out one of the selector bars (47, for example as shown in Fig. 37), the following circuit is closed across circuit S: 1, 69, coil G, 71, 75, contacts 59 and 77, points 79, 81, 83, 85, 87, contacts 17 and 7 of the coin motor switch B, points 9, 11, contacts 13 and 15, point 89.

This energizes the lock-bar coil G, which releases the lock bar 19 holding mechanism and as soon as the lock bar is biased to close the contacts 15 and 21, the said circuit through package delivery motor J is closed. The dotted lines in Fig. 37 indicate an earlier circuit condition for energizing coin-control motor C.

Switch E is for the purpose (when properly positioned opposite 47, 49, 51 or 53) of energizing the coil H, which is the change-return coil. Switch E like switch D is operated by one of the selector bars 47, 49, 51, 53 with which it is in registry. Only one of switches D or E can be operated at a time.

When change-making switch E is operated by one of the selector bars (49, for example) as indicated in Fig. 38, the following circuit is closed: points 1, 69, where one branch goes to the coil H, points 67, 65, 63, contacts 97, 99 of coin supply switch F, point 101, contacts 103 and 105 of change-making switch E, points 107, 81, 83, 85, 87, contacts 17, 7 of switch B, 9, 11, 13, 15 and 89, thus closing in the change-making coil H across the line S. Operation of the switch E to the point shown opposite 49 in Fig. 38, comes about by reason of the operator having inserted a coin to an amount of 5¢ more than the price of the respective package desired. This returns as change one nickel, providing there is such a nickel available at the bottom of a change chute 109. This bottom-most nickel keeps the supply switch F closed as long as there is a supply coin in the chute 109. The purpose of switch F will be elucidated later.

At the time that the change-making coil H is placed across the line S, the lock bar coil G is likewise placed across the line due to current flowing from the branch 69 as follows: through coil G, then via 71, 73, 59, 57, 61, 63, 97, 99 (of switch F) 101, 103, 105, 107, 81, 83, 85, 87, 17, 7, 9, 11, 13, 15, 89.

The above shows that the lock bar release coil G is energized by operation either of selector switch D or E, whereas the change making coil H is energized only by the selector switch E. Or, stated otherwise, switch E energizes coils G and H, whereas switch D energizes only coil G.

The operation of the electrical circuits shown in Figs. 35–39 broadly is as follows:

First, the unloaded machine causes the circuit to be in the condition shown in Fig. 35. When the machine is in operation, six nickels N are accommodated in the change chute 109 (see Fig. 7), the weight of the foremost of which closes the coin supply switch F (see Figs. 36–39).

When the circuit S is plugged in, the heater K is energized. Therefore when money is inserted into the machine, the 5¢ coins are tested in circuit T (as will be detailed later) and then all of the coins move through a counter which accordingly causes operation of the escapement bar 45 properly to position the selector switches D and E according to the amount of money inserted.

In Fig. 35, the auxiliary mechanical diagram shows the selector switches D and E in their lowermost and starting positions.

Referring to Fig. 36, there is shown the condition wherein 10¢ has been deposited resulting in selector switches D and E moving up to the position shown, either by insertion of two nickels or a dime. Then assume that the purchaser, instead of performing an operation to push the 10¢ selector bar 47 for operating selector switch D, has pushed the 15¢ selector bar 49, as shown in Fig. 36. This fails to operate either of the selector switches D or E.

However, the weight of one or more of the inserted coins has closed the coin motor switch B at contacts 5, 7. Coin driving motor C then drives the coins to a position for return, which will later be described. The purchaser upon receiving nothing for the 10¢ deposit naturally will push a coin return button 152, provided for the purpose, which resets the escapement bar 45 and the selector switches D and E and at the same time releases the 10¢ deposit for return at a coin return cup 111.

Fig. 37 shows what occurs upon a 10¢ deposit when the purchaser pushes the proper 10¢ push button. Instead of the selector bar 49 moving freely to the right as in Fig. 36, the selector bar 47 moves to operate the selector switch D. The dotted circuit lines in Fig. 37 indicate the initial condition of the circuit, closing in response to the insertion of the 10¢ deposit (see also the heavy line circuit in Fig. 36). The coin motor C first operates, as before and then contacts 5 and 7 of switch B reopen. Closed contacts 59, 77 of selector switch D serve through closed contacts 7, 17 of switch B to energize the lock bar release coil G which releases the lock bar 19 to move the lock bar switch A to the right-hand position shown. This closes in the heavy-line circuit to the package delivery motor J. After the motor J starts, it closes its own circuit, even through the lock bar switch A reopens. This constitutes normal operation of the machine without change return to the customer.

In Fig. 38 is shown a condition wherein, for example, a 20¢ deposit is made and push bar operation performed for delivery of a 15¢ package, which means that the purchaser is entitled to 5¢ change. In this case, the insertion of 20¢ in any denominations causes the coin counting mechanisms to actuate the escapement bar 45 four steps so that the selector switches D and E thereon move up to the positions shown. Selector switch D is then opposite the selector bar 51 and the selector switch E is opposite the selector bar 49. The purchaser operates the push rod corresponding to the selector bar 49 associated with the 15¢ brand, and this moves the selector switch E to closed position as shown.

In Fig. 38, the dotted lines again represent the starting conditions wherein the operation of the coin motor C has been temporarily set up. Closure of the selector switch E energizes the lock bar coil G and also the 5¢ change coil H. Energization of the lock bar coil G releases the lock bar 19 to cause switch A to close contacts 15, 21, which again energizes the package delivery motor J as before. At the same time, the energization of the 5¢ change coil H causes release of the lowermost 5¢ piece N from the change chute 109. Since the operation of the change coil H removes the weight of the 5¢ piece adjacent to the coin supply switch F, this switch momentarily opens, which causes reopening of the circuit to the coil H.

The energization of the lock bar coil G and of the change coil H through switch E is simultaneous. Therefore 5¢ change is made before the released lock bar 19 opens the contacts 13, 15 of switch A. Then, by the time that the switch F recloses when the next 5¢ piece rolls down, the contacts 13, 15 of the lock bar switch A have opened, which breaks the supply circuit to the switch F, thus assuring no further change.

It is to be noted that the circuit as made in Fig. 38 has the possibility of being operated from the button corresponding to a 20¢ article, with delivery of that article. Thus, if the purchaser had chosen the button corresponding to the 20¢ selector bar 51, the selector switch D would have been operated, with consequent operation as in Fig. 37, that is, as in the case in which the proper value of the selector bar has been chosen for the amount of money deposited, without return of change.

Figure 39:
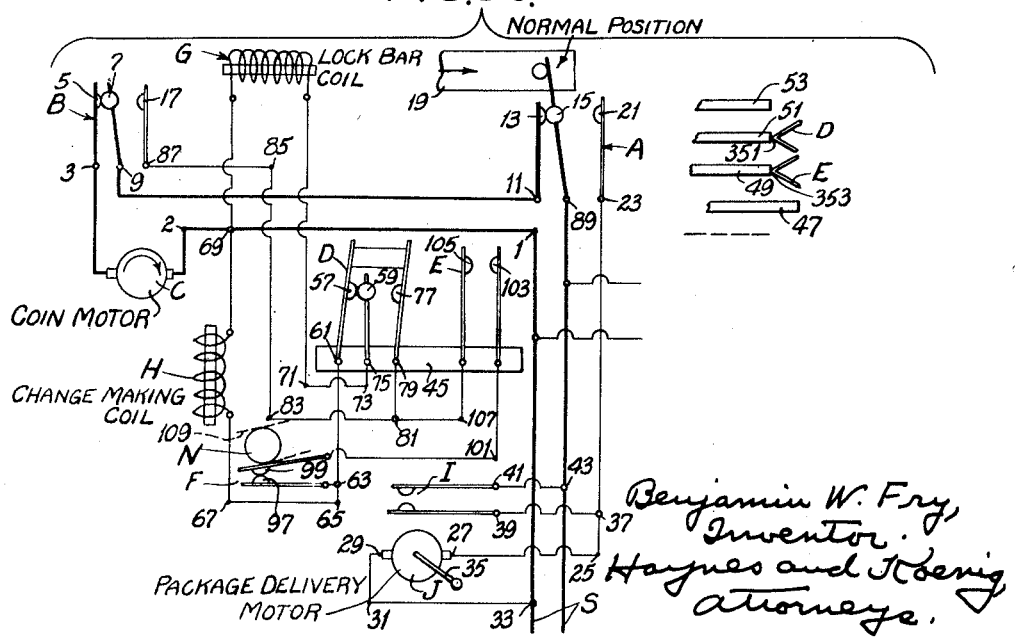
Fig. 39 is a view similar to Fig. 36 showing the parts set for a 20¢ deposit and an operation for a 10¢ purchase.

In Fig. 39 is shown a condition in which 20¢ has been deposited and a push bar operated corresponding to a 10¢ package value. It is intended that this shall not result in package delivery with the return of 10¢ worth of change, because the machine required for carrying out this 10¢ change operation is open to so much possibility of fraudulent manipulation that it is not desirable. Thus in all cases in which the deposit exceeds the price by more than 5¢, it is preferable simply to set up a mechanism for making direct return of the entire excessive deposit.

In the case of Fig. 39, the insertion of 20¢ (for a 10¢ package) causes the escapement bar 45 to move up so as to place the selector switches D and E too high, as shown. Then the purchaser naturally operates the button for moving selector bar 47. This is too low in position and nothing happens to selector switches D or E. However, the purchaser will naturally push the coin return bar 56 when he receives no package for his money, and this causes release of the 20¢ deposit which has gathered in the coin chutes to be described.

*General mechanical features*

Referring now more particularly to Figs. 1 and 2, there are shown sides 113 and a back 115 supported upon a base 117. Hooked into the front of the base 117 is a front panel 119 which may pivot forward on a lower hook 154 (Fig. 3), swinging as shown in dash lines in Fig. 2. The front panel carries on it a right-hand coin-return cup 111, a central package receiver 121, and at the left a match-book receiver 123. The cups 111, 121 and 123 are associated with suitable adjacent openings, through the panel 119. A coin inlet is indicated at 125 which receives the necessary pieces. Below the coin receiver 125 is a coin testing and counting unit T which is made along the lines of the testing and counting unit shown in said United States Patent 2,361,835, but to be further described herein. Below the testing and counting unit T is a coin receiving box 129 for good coins. This coin box receives only 5¢ and 10¢ pieces. All other unwanted coins pass into the coin cup 111 as will appear. If desired, a coin selector may be employed between receiver 125 and unit T, but this is not shown, being an attachable item of any desired design which may be purchased for the purpose.

At 131 is shown a chute that passes from one end of a horizontal match container 133, to the match delivery cup 123. Below the match container 133 is a horizontal penny change container 135 which sends pennies from the other end of the machine down a penny chute 137 and through a passage 139 (Fig. 17) and into the coin cup 111.

Behind the receiver 121 is a flaring delivery trough 141 which receives packages from a series of inner openings 431 across the width of the machine, in the manner to be described. This is for gravity feed to the central package delivery cup 121. The openings 431 are in package magazines 147 (Fig. 34).

The upper portion of the front panel 119 (Fig. 3) slopes back at 143 and is depressed, where it is provided with a long window 145 for viewing one each of various brands of packages in the openings 431, located for display at the upper ends of the individual supply chambers 147. Above the window 145 are openings 149 from which push buttons 151 extend forwardly. These are located on push rods 55 extending rearward (see also Figs. 13 and 31). The push rods 55 are located under the horizontal penny container as shown in Fig. 3. The individual supply chambers 147 extend vertically and parallel as indicated in Figs. 3, 4, 6 and 9. At their lower ends 153, they have the hooks 154 in rotary engagement with the upper portion of a wall 155. They are movable forward for refilling and may also be removed, if desired. The wall 155 is at the lower portion of the machine and in this region is carried the delivery mechanism operative in conjunction with said supply chambers 147. This will later be described.

*Coin tester and counter; 5¢ component (Figs. 7, 9, 17-24 and 28)*

This tester and counter consists of a supporting plate 201 in which on one side is an upper nickel coin inlet 203 (Fig. 17). Branched from this inlet 203 are two outlet passages 205 and 207, the former for rejected (or spurious) 5¢ coins and the latter for accepted 5¢ coins. Suitable cover plates 209 are used to cover these passages. Parts of passages 203 and 207 are defined by the edge 259 of a rotary wheel 257, part by a stationary edge 261 on the support 201, and part by a stationary edge 309.

Aligned rectangular front and rear openings 211 within the region of the inlet 203 provide space for a horizontal movable intersecting lever arm 213 which sets off coin-motor switch B for temporary closure.

At the rear the lever 213 reaches to a pivot pin 215 (Fig. 20) mounted upon an extension bracket 217. The pivoting portion of the lever is formed as a U-shaped knee 219, and opposite to the lever 213 is formed as a downward finger 221.

Upon the finger 221 rests pad-like end 229 of a follower bar 223. The bar 223 is pivoted at 225 for rocking movement. The pivoting of the bar 223 is quite loose, so that it has a substantial amount of play lateral to the plane of rotation, as suggested by the dotted line position shown in Fig. 20. This follower bar 223 is biased against the finger 221 by a bias spring 227. It is also normally biased in a counterclockwise or return direction (referring to Fig. 19) by the same spring 227.

The pad 229 at the upper end of the bar 223 slides on finger 221, and is also laterally movable by the finger. The bar 223 also includes extension 231 composed of insulating material which, when the bar 223 is rocked into clockwise position (Fig. 19) contacts with the springing center contact 7 of the coin motor switch B to close contacts 7 and 17 (see also Figs. 37 and 38).

When the bar 223 is swung counterclockwise to the left, to the dotted line position shown in Fig. 19, the finger 231 permits the contacts 5 and 7 to spring shut, as also indicated in Figs. 36 and 39. This closure is temporary as indicated by dotted lines in Figs. 37 and 38. The bar 223 includes a follower finger 237 which can drop into the inner portion of a spiral groove 239 in a spiral cam 241. When this cam 241 is rotated clockwise (Fig. 19) it will then force the follower 237 to the right, thus carrying the bar 223 to the solid line position shown in Fig. 19.

The spiral cam 241 is driven to rotate by way of a gear train 243 mounted in a support 245. The train is driven from the shaft 247 of the coin control motor C, which is fed through contacts 5 and 7 of switch B. The coin control motor C is energized by the A. C. circuit S; provided contacts 13 and 15 of the lock-bar switch A are closed.

Operation of this testing and counting mechanism per se is as follows:

When a 5¢ piece is inserted, it is received at the inlet 203 from the coin inlet 125. It drops down upon and depresses the lever 213, and therefore moves the finger 221 to the left (Fig. 20). This moves the bar 223 to the dotted line position lifting finger 237 from groove 239, whereupon the biasing spring 227 moves the bar to the left (Fig. 19). In the meantime the pad 229, while riding on 221 holds the follower 237 clear of the spiral groove 239. The spring 227 also biases the bar 223 to the right in the plane of Fig. 20, but the weight of the coin causes the finger 221 to hold the bar 223 with its finger 237 clear of cam 241. The arcuate form of the pad 229 reaches over a substantial part of the face of the cam 241. When the coin leaves the lever 213, the lever rises, thus permitting the follower finger 237 to drop into the center of the spiral groove 239 of the cam. The groove 239 is of buttress form and the follower finger is pointed, having a flat buttress-engaging end 253.

The contact finger 231, upon coin insertion, is first pulled away from the switch B and therefore the contacts 5 and 7 of said switch close temporarily the circuit to energize the coin driving motor C. This also causes rotation of the cam 241 from the gear train 243. The follower 237 is at this time in the center portion of the groove 239, as the cam 241 starts to rotate. The result is that the follower finger 237 is driven to the right (Fig. 19) by the spiral cam 241 until the contact finger 231 reopens the contacts 5 and 7 of switch B. Thus a predetermined motor operation is attained for driving the shaft 255.

The shaft 255 carries a resilient rubber wheel 257 which, as a consequence of the mechanism above described, is turned only a predetermined amount upon insertion of a coin. The wheel 257 is located with a small-diametered edge 259 in the plane of inlet 203, so that as a 5¢ piece rolls down over the edge of the depressed lever 213, the edge of the coin N then drops upon the wheel edge 259 and is wedged into rolling contact with the outer arcuate edge 261. Thus the 5¢ coin N is driven by the wheel to roll over the fixed edge 261 and as it advances it comes under pressure of a spring 263 which has a good electrical contact with plate 201. Spring 263 reaches through an opening 202 to contact the coin N (Fig. 22).

At this point it is an object to test the 5¢ coin N for possible spuriousness as to metallic constituency. The thermo-electrical circuit for this purpose is shown at the right of Fig. 35 wherein K indicates the heater coil above mentioned as being energized from the circuit S (see also Fig. 35).

The heater coil K heats a testing contact 271 against which the coin N is positively rolled by the wheel 257 (Fig. 22). The spring 263 constitutes a second contact at this point, which in connection with the coin closes a thermo-electric circuit (Fig. 35). This circuit 273 includes the coil 275 of a galvanometer (current-measuring device). Energization of the coil 275 causes movement of an armature 277 to close a galvanometer relay switch 279, provided the current is enough in the thermo-electric circuit 273 to effect closure. This occurs only when a coin of a proper alloy (such as a United States nickel) is placed between the contacts 271 and 263. This energizes a relay coil 285 from a bank of dry cells 283.

Referring to Figs. 23 and 24, the relay coil 285 is mounted upon the cover plate 209 by means of a bracket 287. Pivoted to the bracket at 289 is a magnetic armature 291, which by means of a coil spring 293 is normally biased to a position against a stop 304 as shown in Fig. 24. In this position, the armature 291 interlocks behind a deflector 295 pivoted at 297. When interlocked, the deflector assumes the position shown in Fig. 24 against bias of a spring 299. Thus the deflector 295 is normally held against bias by the armature 291. Otherwise it springs out as shown in Fig. 23.

Whenever the coil 285 is energized by closing the contacts 279 (acceptable 5¢ coin N inserted), then the armature 291 is pulled up from the interlocking position shown in Fig. 24 to the position shown in Fig. 23. Thus the deflector 295 is released for bias by spring 299.

The deflector 295 has a deflector lip 301 which passes through opening 303 at a point where the rejected-coin passage 205 branches. Thus if the coin N passes the test during its period of closing the circuit 273, the relay coil 285 is energized and by opening the interlock between 291 and 295 permits the deflector lip 301 to move clear of the outlet passage 207, whereupon the coin falls into said passage 207 against track 309.

The deflector 295 also includes a tail piece 305 which, when the deflector is biased as shown in Fig. 23, reaches into an opening 307 and intersects the accepted-coin passage 207. This tail is forced out by the accepted coin N in passing, which resets the deflector 295 behind interlock member 291 (Fig. 24). The coil 285 by this time has become deenergized (by movement of the coin N from the contacts 263 and 271 and opening of the switch 279) and permits the dropping of the armature 291 behind the deflector 295, to hold the latter in intersecting position for actuation by the next accepted 5¢ coin N.

Rejectable coins do not close the circuit to coil 285 and since lip 301 is not moved out are deflected into the passage 205 for return to cup 111.

One purpose of the positive drive by wheel 257 is to force the 5¢ coin N positively to reset the tail piece 305, so as positively to reset the deflector 295. Another and more pertinent purpose for the present invention is positively to force the coin into contact with the lip 311 of a rocker 313 pivoted at 315 (see Figs. 7, 17, 27 and 28). In doing so, it first drops down onto the track 309. Lip 311 of rocker 313 intersects the chute 207 so that when the coin N is forced over it the rocker 313 is rocked counterclockwise (Fig. 7). The rocker 313 carries a downward extension 319 pivoted to an escapement pawl 323. Reciprocating movement of the pawl 323 due to action of the lip 311 is caused by an accepted 5¢ coin N. Return movement of pawl 323 is due to a spring 322. After a 5¢ coin passes the lip 311, it drops into the accepted-coin chute 207 to a platform 163 where it is temporarily held up by a pin 179.

Shortly after the 5¢ coin, whether accepted or rejected, leaves the wheel 257, the spiral cam 241 has rotated the distance necessary to cause the finger 231 to open the contacts 5, 7 of switch B, so that the motor C ceases to drive rubber wheel 257. At this time contacts 7 and 17 of switch B are closed. The apparatus is then in condition for receiving the next coin and for performing other operations to be specified.

*Coin counter, 10¢ component (Figs. 1, 16–27 and 42)*

The 10¢ component of the coin counter is on the other side (inside) of the plate 201. It has no testing functions for 10¢ pieces. It has a rejected 10¢ coin chute 206 which is parallel and on the other side of the 5¢ rejection chute 205 (Fig. 17). It also has an accepted 10¢ coin chute 208 parallel to and on the other side of the accepted 5¢ chute 207. The rejected-coin chutes 205 and 206 join together at a bevel portion 157 which ultimately leads to the return cup 111 via curve 158. 10¢ pieces also operate the lever 213 which through motor C temporarily actuates the rubber wheel 257. 10¢ coins enter at chute 200 from passage 14 in member 125 (Fig. 20). For driving 10¢ pieces the wheel has a large-diameter edge 260, the pieces being wedged and driven to roll around on track 262 (opposite track 261). They are not electrically tested. Each then drops down into engagement with fixed track 310 and is forced successively over a first extension 311 on rocker 313 and then over a second extension 312. It will be noted from Fig. 27 that the extension 312 is notched as shown at 161 which accommodates passage of nickels N without registering movement a second time. However, dimes register two movements of the lever 313 and consequently two reciprocating movements of the escapement pawl 323. Thus passage of a 5¢ piece results in one reciprocation of the escapement pawl 323 and passage of a 10¢ piece results in two reciprocations of this bar.

It should be noted that any coin selector mechanism, if used between inlet 125 and tester T, separates 5¢ and 10¢ pieces to enter T in different planes for entry outside of the plate 201 (5¢ pieces) or inside (10¢ pieces). To avoid the unnecessary procedure of detailing known selectors the inlet 125 is shown as having parallel chutes 14 and 16 leading respectively to inlet passages 200 for dimes and 203 for 5¢ pieces. Inlet 125 has separate 5¢ and 10¢ inlet slots 18 and 20 respectively (see Fig. 1).

*5¢ and 10¢ coin release (Figs. 7, 9, 16, 17 and 42)*

When a 10¢ piece leaves counter fingers 311 and 312, it also drops to the shelf 163 which intersects passages 208 and 207, as in the case of a 5¢ piece. This shelf is on a plate 165 (Fig. 18), and is pivoted at 167. It has an arm 169 engaged by a finger 171 of a slide bar 173. The bar 173 is normally biased down by a spring 175 (Fig. 7) and is raised by a finger 585, to be described. Whenever the bar 173 is forced down the plate 163 clears both passages 207 and 208 to drop 5¢ and 10¢ pieces into the lower ends of passages 207 and 208 respectively for acceptance in the box 129.

Before being dropped, either 5¢ or 10¢ coins are prevented from rolling into coin-return passages 110 and 178 respectively, by the pin 179 intersecting these passages and located on a rocker 181 (Fig. 7). When the rocker 181 rotates clockwise (Fig. 7) any 5¢ and 10¢ piece resting on the unpulled shelf 163, are permitted to roll down the passages 110 and 178 to the coin-return cup 111, coming together at the bevel 157.

5¢ pieces that are not released by the pin 179 and which are released from the shelf 163 drop down and strike a deflector 183 and then to the left into a 5¢-change chute 109. This chute 109 holds six 5¢ pieces N, and when filled causes deflection of any more coins to the right and down the lower end of chute 207 which leads to the coin box 129.

The lowermost 5¢ coin in chute 109 rests upon the hooked end 189 of a lever 187 (Figs. 7 and 42) which intersects passage 109. Weight of the coin on lever 187 closes coin supply switch F (Fig. 7).

Figure 42:
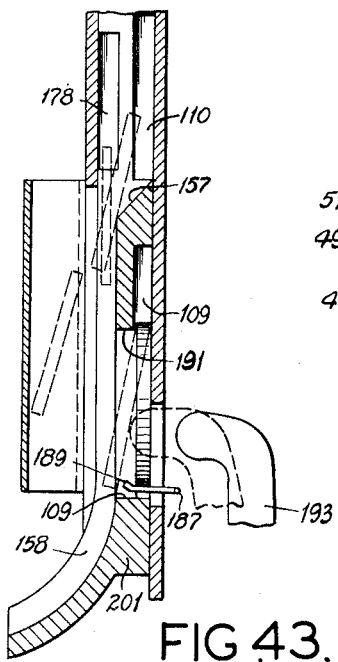
Fig. 42 is an enlarged vertical section on line 42—42 of Fig. 7.

The lower end of the chute 109 is provided with a lateral opening 191 just below bevel 157 which, when the 5¢ coin rests on finger 189 also supports the coin at the upper edge. However, the coin may be pushed out at its lower edge and off of the finger 189 (Figs. 9 and 42). It then moves through the opening 191 and then passes to the coin return cup 111. Pushing through is accomplished by means of a finger 193 pivoted at 195. Pinned at 197 is a connecting rod 199 which in turn is pinned at 325 with the armature 327 of solenoid coil H. Thus, whenever solenoid coil H is energized (which is only when selector switch E is closed in addition to coin supply switch F, see for example Fig. 38), armature 325 is pulled up and a 5¢ piece N is pushed out.

10¢ pieces that are released from the shelf 163 (when not released by the pin 179) never supply change. They simply drop down through the lower portion of the passage 208 to the coin box. Any dimes that go down the passage 178 are only such as are returned to the customer under action of the return coin push button, which, as will appear lifts pin 179.

*Escapement mechanism (Figs. 7, 8, 25, 26)*

In view of the above, the pawl 323 reciprocates once in response to insertion of a 5¢ piece and twice in response to insertion of a 10¢ piece. Fastened to the pawl 323 at 329 is a cross head 331 to which is pivoted at 333 a retractable anchor 335 which has two fingers 337 and 339 reaching through openings 341. A spring 343 biases the anchor to the normal driving position shown in Figs. 25 and 26.

The escapement bar 45 is provided with notches 345 on one side and 347 on the other. These are in the plane of motion of the fingers 337 and 339. The distance between fingers 337 and 339 is slightly greater than the distance between the bottoms of the notches on one side of the bar 45 and the tops of the projections between notches on the other side of the bar. The notches 345 and 347 are respectively pitched a distance apart equal to the pitch distance between the selector bars 47, 49, 51, 53 (see also Fig. 3), and all the notches 345 are staggered one-half pitch distance with respect to all the notches 347. Therefore, upon one complete reciprocation of the pawl 323, the escapement bar 45 will escape from holding fingers 337, 339 and move up a distance equal to the distance between two of the selector bars 47, 49, 51 and 53. The escapement bar 45 is biased up by spring 349 and selector switches D and E are fastened to said bar. These switches D and E are each provided with non-conducting contact edge portions 351 and 353 respectively (Fig. 8), which are set apart equal to the pitch distance between the selector bars 47, 49, 51, 53. Since the lowest price of a package to be sold is usually 10¢, the edge 351 has a starting position equal to two pitch distances below the first selector bar 47 (Fig. 35). Thus it requires at least two reciprocations of the pawl 323 to position switch D opposite the lowermost (10¢) selector bar 47, as shown in Fig. 36, and one more reciprocation for each step above that. It requires at least three reciprocations of the pawl 323 to bring the change-making selector switch E opposite the first selector bar 47. This means that at least 15¢ must be deposited in the machine before 5¢ change can be obtained, as for example when a 10¢ purchase operation is performed.

*Selector operating apparatus (Figs. 3, 7, 8, 13, 15, 31)*

The operator selects his article by examining the exposed topmost articles 501 behind the window 145. The precise article that the purchaser will obtain is presented to view, and the purchase price is shown. The additional supplies of the respective articles are in the magazines 147. Above the respective article is the respective push button 151 for obtaining it.

Each push rod 55 is in slide bearings 405. Each rod 55 is provided with an interlock cam (Fig. 13) which wedges between beveled ends of adjacent tumblers which are laterally slidable under guides 359. The tumblers 357 are each separate. They aggregate in length, when all are abutted except at one clearance point such as 363, the distance between two end stops 361. They may be separated at a single point, such as, for example, at 363 (Fig. 13) by the insertion of one, but only one, cam 355. All other cams 355 are then locked out. Thus it will be seen that the tumblers 357 will admit of pushing only one push rod 55 at a time, but any one may be selected. This type of interlock construction is shown for example in my copending United States application, Serial No. 295,005, filed September 15, 1939, for Vending machine, eventuated as Patent 2,305,342.

The push rods 55 are for the purpose of individually pushing levers 365 which are return biased by springs 367. The levers 365 are movably articulated with the push rods 55 at notches 369. Rubber bumpers 371 are mounted upon the push rods 55 and engage the rear support 401, to limit forward motion of the push bars. Rearward motions are limited by struck-up tongues 403 (Fig. 13).

The levers 365 form parts of vertical rods 383 which reach down to the bottom of the machine to perform delivery control functions. In addition, each rod 383 has fixed to it a suitable pin 385. The plane of each pin is chosen to operate one of the selector bars 47, 49, 51, 53. The bars slide on projections 30 (Fig. 3). They are identical and are arranged in a tier, and each has downward extending lips 389 between which are notches 391 to receive the pins 385 for cooperative movement. Thus each selector bar 47, 49, 51, 53 corresponds to a package value of 10¢, 15¢, 20¢ and 25¢, respectively. Suitable reset holes 387 are provided for repositioning the pins 385, as desired. There may be two pins 385 in a single plane, operating alternately upon a single selector bar, because there may be more than one brand of a package of a given cost. Thus when a push rod 55 is pushed, the respective pin 385, but only one, is rotated counterclockwise (Fig. 13) to push the respective selector bar which is at the level of that pin. The motion of a selector bar is toward the switches D and E, and each bar is biased for return by a tension spring 399.

Selector switch D, if positioned to be operated by a selector bar, energizes the lock bar coil G (see the heavy lines in Fig. 37). The horizontal lock bar 19 carries a pin 373 (Fig. 13) which is held up by a pawl 375. Spring 377 biases the lock bar 19 to the right. The pawl 375 is formed as a bell crank pivoted at 379 and biased by means of a spring 381 to hold the pin 373. The bell crank is electrically operated against its bias by the armature 381 of the lock bar coil G (see pin joint 374). Thus it will be seen that when any selector bar 47, 49, 51 or 53 is pushed against properly elevated switch D, the circuit is closed through the lock bar coil G (see Fig. 37), the pawl 375 is pulled clear (compare Figs. 13 and 15) to release the lock bar 19 to be biased by the spring 377.

Notches 393 in all push rods 55 permit turned-up tongues 395 of lock bar 19 to pass to the right under all the push rods that are locked out of movement. As to each push rod, when selected and pushed in, the respective tongue 395 may pass into a notch 397, thus temporarily locking that push rod against return. This is shown in Fig. 15, wherein the movement of the lock bar 19 is enough to operate the lock bar switch A but no more than to bring a tongue 395 into notch 397 of the moved push rod 55. Thus the push rod cannot be returned by release, or by pulling on it, until the lock bar 19 returns. When the lock bar returns (in a manner to be described), the tongue 395 clears notch 397 to permit return of the particular push rod 55 which has been moved. Then the selector bar of the group 47, 49, 51, 53 which has been moved, returns under return rotation of the respective pin 385. Switch D then reopens at contacts 59 and 77.

*Delivery and discharge mechanism (Figs. 3, 5, 9, 13, 14, 15, 34)*

As mentioned in my United States patent application, Serial No. 290,587, filed August 17, 1939, for article delivery machine (eventuated as Patent 2,238,725), it is made clear that vending apparatus of the type in which the articles are stored more or less beneath the operating parts, saves head room. In the present case, this so-called console type of cabinet is used. The selector bars 47, 49, 51, 53, the push rods 55, and tumblers 357, match supply box, 1¢ coin box, and other parts mentioned are located more or less horizontally at the top of the machine, and underneath these and toward the front are stored the articles. At the rear of the machine, the rods 383 are brought down to a lower bearing 407 and from these points control discharge operating mechanism indicated generally at 409. Each discharge mechanism 409 operates in association with a package container 147, one of which is shown in perspective in Fig. 34.

Each discharge compartment 147 (Figs. 3 and 34) consists of a rounded bottom 411, rear guides 413, sides 415 and front guides 417, joined by bars 419 at the top and by a bar 421 at the bottom. Guides 417 are notched to provide an opening 431, above which are short flanges 445.

The contained space is divided into two by a vertical wall 423, at the lower end of which is a light leaf spring 425 and at the upper end of which is hinged flap 427, which may swing forward and backward. From the lower one of the front bars 419 extends a light leaf spring 429 which presses lightly against the lower end of the flap 427. Through the opening 431 between the side walls 415 and the bars 419 may be viewed the package which is to be delivered, the package being directly behind the window 145 and above the spring 429.

Each compartment 147 is rotary on lower hook 154 and may be angled forward for filling, or removed if necessary. At the top it has a rest 426.

Each flap 427 may lie back against a stop 433 but is normally pushed forward in alignment with the wall 423 (which spring 429 permits) by means of a horizontal pusher plate 435. Plate 435 is held in endwise guides 437 and may slide forward and backward under influence of two eccentric cams 439 on a cross shaft 515. The pusher plate 435 is biased against the eccentric 439 by means of a biasing spring 443. When the plate 435 is forward, the flap 427 is so related to the spring 429 and the pair of forwardly located flanges 445 that a package is held in a stationary vertical position with its rear bottom edge on the top edge of the spring 429 and its front edges held in by the flanges 445. This presents it to view through the window 145.

It is the intention that a package shall be released by angling back the respective flap 427 to the position shown in dotted lines in Fig. 3, and in solid lines in Fig. 34; whereupon the package may slip out of the opening 431 as indicated in the lower dotted lines in Fig. 3. Thus released, the package falls down into the sloping trough 141 and slides down to the delivery cup 121 (see also Figs. 1 and 2). Thus the purchaser obtains the very package that he sees through the window 145.

A supply of horizontal packages 447 is stacked behind the wall 423 on a bottom portion 449. It is the purpose of the mechanism 409 to push the bottommost package from the supply 447 past the spring 425 down into a more or less vertical position in a pocket 451, from which it is flung up through the front compartment 453 and past the light spring 429, the spring functioning thereafter to act as a support as long as the flap 427 is in forward position. Thus spring 429 functions in association with the flanges 445 as a trap to present the next package to view for a subsequent delivery after it has been flung up.

The delivery mechanisms 409 consist of three cross shafts 455, 457 and 459, held in lateral bearing blocks 461. Shaft 455 turns and is driven by a gear train 463 from the delivery motor J. This shaft 455 carries a group of interior cams 465. The shaft 457 is stationary. Shaft 459 is oscillating and carries centering devices 467 on opposite ends normally held horizontal by springs 469 (Fig. 5). Thus the shaft 459 is normally held in the upper solid-line position shown in Fig. 3 wherein elevators 471 are up. The ends 473 of the elevators 471 swing in the lower pocket 451 between flanges 415. To temporarily force the elevators down to the dotted line positions shown in Fig. 3, there is provided at one end of the cam shaft 455 a lever 475 carrying a follower roller 477 driven by a cam 479 (Fig. 5). One revolution of the cam 479 results in depressing the pushers 473 (dotted lines, Fig. 3) and then suddenly releasing them from the dotted line to the solid line position of Fig. 3, under action of the centering springs 469. This provides a snap-action for package elevation past spring 429.

In order to push packages from the supply column 447 on to depressed elevators 473 as the elevators are depressed, there are provided rocker arms 481 which rotate individually on the stationary shaft 457. Each rocker 481 is provided at its upper end with retractable pusher fingers 483 biased upward by a spring 485. Thus as a finger 483 advances to the lowermost one of the supply packages 447 it will push it out past the spring 425 and into the lower dotted line position shown in Fig. 3, onto the corresponding elevator 471 which is at this time depressed. When the pusher arm 481 swings back (clockwise in Fig. 3) the finger 483 rotates against bias of spring 485 underneath the next descended package 447. This descended package in supply 447 cannot move backward because of the rearward flanges 413 which hold it. Each rocker arm 481 is operated from an attached follower 487 which in turn is operated by an adjacent cam 465 on said shaft 455. Each revolution of the respective cam 465 causes one oscillation of the rocker arm 481. Cams 479 and 465 are timed so that upon retraction of 471, an arm 481 moves forward; and upon retraction of an arm 481 elevator 471 flips up the package which has been pushed onto it.

Since it is desired to have only one rocker arm 481 operate in accordance with a purchaser's selection, each vertical rod 383 couples in the respective rocker 481 for operation (Figs. 3 and 14). This is done by providing a shifter bar 489 for each rocker arm 481 adjacent bars being arranged to be non-planar to avoid interference. It will be seen from Fig. 14 that each rocker 481 is shaped like a bale, and the outer ends of shifters 489 are within the bottom portions of these bales, as indicated at 491 in Figs. 3 and 14. To operate each shifter bar, each rod 383 is provided at its lower end with a pin 493 operating in a slot 495 of the respective shifter bar 489. Thus each shifter is pivoted at 497 and is under rotary control of the rotary motion of the respective vertical rod 383. Hence, when a purchaser pushes in a button 151 to operate a push rod 55, the respective rod 383 is rotated counterclockwise (Figs. 13 and 14) thus to rotate the respective shifter bar 489 clockwise and to carry the respective follower 487 into engagement with respective cam 465. Therefore, upon rotation of the cam shaft 455, the particular rocker 481 for replenishing the particular kind of package that was delivered upon purchase becomes operable. As a package is being pushed out from the supply 447, the respective elevator 471 descends to receive it. Then the rocker 481 moves back and the cam 479 is so timed that the elevator flips up suddenly (see the quick-return surface 499 on cam 479) to send the package up the passage 453 past the spring 429 and into the position formerly occupied by the purchased package. Since the flap 427 at this time is vertical, the package is held as shown at 501. The rocker arms 481 are normally spring-returned against the member 407 by means of springs 503.

*Alternative delivery construction (Figs. 40 and 41)*

If desired, the cams 465 may be eliminated by providing only one cam 466 (like cams 465) and causing this to operate a follower 488 which however is attached directly to shaft 458 which is equivalent to shaft 457 of Fig. 3. In this case, shaft 458 is made square in order to provide ready means for attachment of various parts. On this shaft 458 are a plurality of rocker arms 482 having pusher fingers 484 upwardly biased by springs 486. Upward bias of the respective pusher fingers 484 is prevented when desired by mask levers 490 which oscillate in a horizontal plane on the respective vertical rod 383. The normal position of each mask 490 is in masking position, as shown in Fig. 41, wherein, upon oscillation of the shaft 458 from cam 466 the finger 484 is depressed to prevent it from pushing from behind the lowermost package of supply 447. Whenever a purchaser pushes in one of the push buttons 151 and the corresponding push rod 55, the respective shaft 383 is rotated counterclockwise to clear the respective mask 490 from the respective finger 484, thus permitting the finger to bias up upon forward movement to push out a package in the corresponding supply compartment.

*Penny change maker (Figs. 3, 4, 6, 7, 8, 9, 11, 12, 13, 15, 32)*

Many sales require payment of a tax according to full 1¢ units which may make the cost, for example, of a 10¢ package 11¢, a 15¢ package 17¢, a 20¢ package 23¢, etc. These taxes are different in different localities and are different for various articles. Other reasons may also exist for packages priced at odd cents. The penny change making apparatus to be described is easily adapted to all conditions in this respect. Thus, when for example a package having a base price of 15¢ is purchased, the gross cost may be 17¢ or 18¢, and the purchaser is required to insert 20¢. By simple adjustment the customer will receive 3¢ change on the 17¢ package and 2¢ on the 18¢ package.

The penny change making linkage is at the top of the machine at one end of the penny box. This linkage is driven from the cam shaft 455 located at the bottom. This is done through a chain drive 505. The cam shaft 455 also carries the cam 35 which operates to close the switch I for maintaining closed the circuit of the motor J, for a complete cycle of operation (see also Figs. 35–39). The chain drive 505 passes over a take-up idler sprocket 507 and then over upper sprockets 509 and 511. The latter are coupled together by a connecting link 513. Sprocket 511 is on a rod 515 which passes through the length of the machine to a pinion 517 on the other end, which drives match delivery apparatus to be described later.

The connecting link 513 is driven with parallel motion since its connections with the sprockets 509 and 511 are at equal phase angles. This connecting link 513 is provided with a slot 519 within which are four engaging roller pins 521, mounted respectively upon square penny knock-out rods 523. Each knock-out rod 523 slides at its lower end in a bracket 525. It is guided loosely enough that it may also swing laterally as indicated in dotted lines in Fig. 11. The connections between the roller pins 521 and the slot 519 are loose enough to accommodate this lateral motion. Thus rotation of the sprockets 509 and 511 results in vertical reciprocation of the knock-out bars 523 with possible lateral motion.

The knock-out bars 523 are normally biased to the left (Fig. 13) against guide lips 529 on the end of penny container 135 by leaf springs 527. In this position, each bar 523, upon reciprocation, is adapted to knock out one, but only one, penny from an adjacent column of pennies.

The penny holding box is shown in Fig. 32. It shows the lips 529 above mentioned. It consists of a bottom 531 on cross bars 535, which are removably attached to parts 401 of the main frame by quick-detachable connections 533. Thus the entire box may be removed for adjustments beneath it when desired. Pivoted at 539 is a cover 541 having an upper deflector lip 543 which becomes located at one end of the box in final position as shown in Figs. 7, 9 and 11.

The box is divided by longitudinal vertical walls 545 into four compartments, each for receiving a stack of pennies and one end of each stack is forced against a pair of lips 547 which are spaced less than a coin thickness ahead of lips 529. Pressure is accomplished by pushers 549 on the opposite ends of the columns, as shown in Fig. 10. Each pusher 549 is connected with a flexible wire 551 which passes under the respective column of pennies and over a lower pulley 553 at the front end of the respective column, passing out of a notch 554 between lips 529 (Figs. 9 and 11). Two wires 551 are used and each passes down under a pulley 553 (Fig. 7) and then up and under the next adjacent penny column to its pusher 549. Each column of pennies thus rides on a wire as a bearing, which reduces friction. Each pulley block 555 is attached to a weight 557 (of which there are two; one being shown in Fig. 7), so that one weight serves to bias two columns of pennies forward against their respective lips 547. Two weights bias all four columns. The respective pairs of lips 547 are spaced apart enough to receive between them the upper ends of the square knock-out bars 523. Also the foremost penny in a column is exposed ahead of the lips 529 to be caught by the upper end of a knock-out bar 523 upon vertical reciprocation of the latter, provided the bar is biased against that penny column. This pushes a single penny to be deflected by the lip 543 (Fig. 9) from which it drops into a chute 137 shown in Figs. 1 and 2. This chute 137 leads to the return coin cup 111, via the side passage 139 passing the coin driving mechanism. The chute 137 may also be seen in Fig. 12.

In order that one, two, three or four pennies may be selected for penny change making purposes, the knock-out plungers 523 are controlled in their lateral movements by four bars 559, 561, 563 and 565 which are laterally slidable in guides 567 just under the coin box 135 (Figs. 7 and 13). They may be exposed by removing the coin box, which is a great advantage in making settings thereon.

Slide 559 at the right end is engageable only with a single knock-out bar 523, which is shown at the left in Fig. 7, and forward in Fig. 13. The second bar 561 is formed with a cross head 569 which engages two at a time of the knock-out bars 523; the third slide 563 carries a cross head 571 which engages three at a time of the knock-out bars 523; and the fourth slide 565 carries a cross head 573 which engages four at a time of the knock-out bars 523.

Each slide is operated from one or more suitably located pins 575 thereon, which pins are engaged by cams 577 on proper ones of the pusher rods 55. Each slide may be operated by one or more of the push rods 55. When a push rod is moved in, the respective cam 577 pushes to the right the respective follower 575 on the respective bar, whereupon the respective number of knock-out bars is moved to inoperative (non-change-making) position. Selection of the number of knock-out bars 523 to be moved into inoperative position is determined by selective placement of the followers 575 and cams 577. Thus if a push rod 55 corresponding to a package upon which there is 2¢ tax is to make the proper 3¢ change, its cam 577 is adjusted (in holes 579) to have its sloping face adjacent to the first slide 559 and then a follower 575 is placed on this slide 559 to be engaged by this cam, whereupon pushing of the corresponding button 151 will cause the slide 559 to move to the right and therefore when the motor driven chain 505 moves the sprockets 509 and 511, and the connecting link 513 moves up all of the knock-out bars 523, three of them will knock out pennies, the one associated with displaced slide 559 being angled and riding up over the end of the column of pennies. The three bars 523 that knock out pennies push on the bottom edges in each of three different columns opposite slides 561, 563 and 565, to eject the three pennies in front of lip 543 and down into the chute 137.

The above will result if push button 151 at O is pressed (Fig. 13). This is on the basis of returning 3¢ change upon 5¢ over-payment, and for the machine to retain the 2¢ tax. The price asked for the article is suitably indicated on the push button 151 or elsewhere. The lid 541 of the box 135 is spring-closed as shown at 542, so that if a bent penny strikes lip 543 it may push it up somewhat to clear. This prevents binding by mutilated or bent pennies.

Fig. 13 also shows that on the bar 55 in the plane P the respective cam 577 has been adjusted to operate a pin 575 on slide 561 which will result in obtaining 2¢ change, because this causes cross head 569 to press out two knock-out bars 523 to inoperative position leaving two others to eject pennies.

At plane Q is shown a condition wherein the push rod 55 carries the cam 577, and the adjacent follower 575 operates the slide 563 which results in moving the cross head 571 for engagement with three knock-out bars 523 to inoperative position, which leaves only one knock-out bar 523 to deliver 1¢ change.

At plane U is shown the condition for providing 4¢ change, in which no cam 577 or follower 575 is employed. In this case, no cross head works on any knock-out bar 523 and all knock-out bars knock out pennies, thus providing 4¢ change.

In some cases, it is desired that no change be delivered, the appropriate condition being shown at plane R in Fig. 13, where respective cam 577 is adjusted opposite to the follower 575 which is placed on slide 565. This operates the long cross head 573 to push all of the knock-out bars 523 into inoperative position and no change is delivered.

It will be understood that holes 579 and 581 are tapped at all desired positions, so that for placing the machine in operation it is simply necessary to choose locations for the cams 577 and followers 575, in order to make the desired change for the respective brands. Since the penny change does not pass through the other change-making apparatus, the structure and adjustments are simplified.

Each push rod 55 is provided with an extending finger 661 which, when the push rod is out, holds a flap 427 in position to hold in the upper package 501, but when pushed in frees this package for subsequent release as soon as the cross plate 435 is permitted to go back by the cams 439 on cross shaft 515.

*Return functions of drive for penny change maker (Figs. 1, 7, 9, 11, 13, 15, 25, 26, 29, 30, 36, 39)*

The motor J runs through a complete cycle which is from the raised positions of the knock-out bars 523 (shown in Fig. 7) back to that position. During this operation, a pin 583 on sprocket 511 operates. At the start of the cycle, this pin holds up the lateral extension 585 of the bar 173. As the cycle proceeds, the pin 583 lets down the bar 173 under bias of spring 175, which causes the gate 163 (for 5¢ and 10¢ coins) to rotate out from coin-blocking position. This permits any inserted 5¢ and 10¢ pieces to proceed to the cash box 129; or, 5¢ pieces may proceed to the 5¢ change supply in chute 109, if required.

Referring to Fig. 11, the pin 587 which joins the link 513 with sprocket 511 is extended. This extended pin 587 is also shown in Fig. 29. It engages a cam plate 589 on a bell crank 591, pivoted at 593 to the frame (see also Fig. 30). The bell crank is normally biased up by a spring 595. Upon rotation of the sprocket 511 the pin 587 pushes down the plate 589. This takes along with it another cam plate 597 on the bell crank 591 which contacts a pin 599 located on an extension from the escapement bar 45. This moves the pin 599 from the upper to the lower position shown in Fig. 29 to return the escapement bar. In order that the escapement bar may move down without interference from the escapement anchors 337 and 339, these anchors are resiliently held by spring 343 as shown in Figs. 25 and 26. Thus the anchors without reciprocation deflect in response to downward passage of the escapement teeth 345, and when the escapement bar 45 reaches its bottommost position, the anchor 337 prevents its rise under bias of spring 349 until the ratchet bar 323 again reciprocates, which is not until the next operation of the machine.

Sometimes, neither the switch D or E becomes operative, as shown for example in Figs. 36 and 39. While such manipulation results in operation of the coin motor C, it does not result in operating the package delivery motor J which was responsible for the return activities just described. This presents a two-fold problem; first, the return of the money to the customer, and second, the return of the escapement bar 45 to initial position. As shown in Figs. 29 and 30 an additional operating button 152 is provided which is marked with some phrase that will invite the customer to push it if he fails to obtain the goods. It is the right-hand button in Fig. 13. It does not operate package delivery means. No part of the window 145 extends under it and the resulting blank space may be occupied with directions for machine operation in general. This button 152 is on an auxiliary push rod 56 which carries an extension 601 for engagement with an upstanding arm 603 of the bell crank 591. Pushing of the button 152 therefore accomplishes the same return functions of the ratchet mechanism as operation of the motor J, as is clear from Fig. 29. The push rod 56 does not carry any cam 577, but it does carry an interlock cam 355 for engagement with the last right-hand tumbler 357. In Fig. 13 the push rod 56 has been broken away to expose parts beneath.

When the escapement bar 45 descends, either by return operation of the motor J or manual return operation of the button 152, a pin 609 thereon engages the heel of the rocker 181 to lift the pin 179 on its opposite end, which will release to the customer any coins accumulated above the shelf 163 and to which he is entitled. In normal delivery operation, any money held by shelf 163 will be cleared to the box 129 by shelf movement upon return operation by the motor J. For this purpose, shelf 163 moves before pin 179. Any tampering with button 152 after pressing a button 151 after insertion of a coin is impossible because of the interlocking tumblers 357.

Return of the lock bar 19 is accomplished by cyclic motion of the cross shaft 515 (Fig. 15). This shaft carries on it in association with one of the cams 439 a barrel cam 605 engageable with a follower 607 on the lock bar 19. Thus, upon rotation of the shaft 515 the lock bar is returned, again to be held in starting position by the latch 375.

*Match delivery means (Figs. 1–3, 5, 7, 9, 10–12, 33)*

The purpose of this apparatus is to supply a book of matches with each cigarette package delivered. The match supply is in a horizontal plane above the horizontal plane of the penny change maker for maximum saving in space, and has parallel supply columns, none of which becomes empty substantially ahead of the time that any other one becomes empty.

The match supply box 133 is shown in Fig. 33 and consists of a bottom 611 resting upon a cross bar 613 which forms a support. Quick detachable connections are provided at 615. These are gudgeons which may be deposited in open slots 701 cut vertically in supporting members 703. This allows complete removal of the box if desired, or rotation on the gudgeons 615 without removal from the slots 701 in order that the penny box therebelow may be reached. From the bottom 611 are upward dividing walls 617 providing three parallel compartments 619. A hinged cover is shown at 621, notched at 622.

At the left end of the walls 617 (Fig. 33) are flanges 623 for holding at certain times the ends of columns of match books 625. Pressing on the other ends of the columns of books are sliding pushers 627 from each of which extend two flexible wires 629. The wires pass over pulleys 631 and then downward by pairs to respective weights 633 sliding in guides 635 on the end of the machine. The wires are positioned on the sides of the wedge-shaped match books and prevent them from spreading laterally (by wedging) and thus prevent jamming.

Normally, the ends of the columns of matches are pushed against tongues 637 of reciprocating claws 639. Each claw is guided by lateral grooved rollers 641, and by a third roller 645 in groove 643. The rollers 641 and 645 space the claws 639 above a train of gears 647, rotary on an end plate 649. The gear train is driven at a 3:1 speed ratio from the pinion 517 on the end of shaft 515 (Figs. 5 and 10).

Each gear 647 is provided with a drive pin 651 which works in a slot 653 of its respective claw. Thus, upon rotation of the gears, the claws execute vertical reciprocating motion and each is one third of a cycle out of phase with the other, the pins 651 providing such action.

Upon upward movement of a claw 639, its tongue 637 moves over the first book of matches in the respective column 625, through a notch 622, and upon descent pulls this book down and out of a chute 131. The lid 621 holds down the match book upon upward motion of the adjacent claw. The respective book moves into position under the tongue 637 by the biasing action of the respective pusher 627. It is then pulled down by the claw out of a slot 655 and is projected into a chute 131, from whence it moves out to the match delivery cup 123. Matches are successively taken, book by book, from successive columns and delivered to the chute 131 as needed, one book being delivered upon each operation of the machine. By this means, all columns are exhausted at the same rate. Thus a continuous supply of matches is available until all match books are used up, and at the same time space is conserved by having the columns arranged in parallel, along with the four-column penny box in a horizontal plane on top of the machine. It may be also observed that unlike the knock-out means for the pennies, the matches are pulled down out of their container and thus no extra head room is required. The fact that the pennies are knocked out upwardly does not require extra head room, because the lip 543 is opposite the head room occupied anyway by the match holder 133. The cover for the machine indicated at 657 forms part of the front panel 119 and is provided with a lock 659.

No jamming occurs when the match box is empty, because the followers 627 have bevel edges 628 for non-hooking cooperation with the tongues 637. The followers 627 are provided with hooks 626 for holding them in retracted positions while filling (see Figs. 9–10 and 33).

*Mechanical operation*

To load the machine, the front panel 119 is unlocked and swung forward, as indicated in Fig. 2. The magazines 147 are rotated forward on their hooks 154 and are filled. They may be entirely removed, if desired, as may be the panel 119. A package is also placed above the spring 429 behind each opening 431. Then the magazine 147 is rotated back into the machine as shown in Fig. 3, resting at lip 420. This forces the flap 427 into forward position to hold the uppermost package 501 in view behind the window 145, a supply 447 being behind the wall 423, as indicated in Fig. 3. The brands are arranged as desired in the respective magazines, according to cost which is appropriately marked on or near buttons 151.

The match container 133 and the penny change container 135 may be removed, thus exposing the parts shown in Fig. 13, which may be inspected or adjusted so that it is certain that the proper penny change making settings by cams 577 and followers 575 correspond to the proper amount of penny change for the respective brands in the magazines 147. Change in 5¢ units is taken care of by properly adjusting the push pins 385 to the proper elevations with respect to the selector bars 47, 49, 51, 53.

It may be noted that the flexible wire 551 (Fig. 7) allows of great latitude in withdrawing the box for adjustment of cams below it, since the weights 557 can be drawn up to allow for this. Also, the center lines of wires 551 are over the lowermost tangents of the respective columns of pennies, thus providing reduction of friction in movement of the penny column. This is because the penny columns ride on the wire 551 which slides on the bottom of its box 135 with less friction than the pennies.

The penny box 135 is then closed and positioned as indicated in Fig. 12. Then the match box 133 is loaded and here also the cords 629 allow for complete removal and also reduce the friction between the side walls 617 of the box and the columns of cartons. The cords thus prevent lateral jamming. Then the box 133 is inserted into the case above the penny box 135, and the front 119 closed.

Batteries 283 are inserted into the clips 663. The circuit S is plugged in, starting the heater K.

The first 5¢ pieces in the nickel change chute 109 are received by machine operation.

If the purchaser inserts the exact total purchase price indicated for a particular cigarette brand which is priced in terms of 5¢ or 10¢ units, and pushes the proper respective button 151, the following occurs: The nickels and/or dimes pass through the coin-testing and driving apparatus T. This results in testing the nickel or nickels, but the dimes are not tested. Any slug rejector (not shown) incorporated under the chute 125 tests the 10¢ pieces.

The passage of the coins through the coin tester and counter results in running up the proper number of reciprocations for the release pawl 323 according to the number of 5¢ values in the total deposit value. For example, if 15¢ is deposited, it might be by three nickels or a nickel and a dime, either of which combinations would provide three complete reciprocations of the pawl 323. The result would be three upward steps of the escapement bar 45. Other values would give other numbers of steps. What the initial insertion of the coins does electrically is to operate the coin motor C for its full cycle of operation for testing and driving coins, and for running up the escapement bar 45 so as properly to position the switches D and E. The coins come to rest on the shelf 163, because at this time the pin 179 blocks their passage to the return chute 177 or 178, depending on whether a nickel or a dime is being considered.

It may be here noted that should the purchaser desire the return of his money because he has changed his mind before pressing a button 151, or is to receive the return of his money because, for example, he put in two 10¢ pieces for a 10¢ purchase, or perhaps 10¢ for a 20¢ purchase or the like, with resulting non-response of the machine, he may obtain the return of his money by pressing the return button 152, which causes the bell crank 591 to push down the escapement 45 through pin 599 (see Figs. 29 and 30). This returns the selector switches D and E to their inoperative positions before they have ever come into operation in view of the absence of action from any button 151. The pin 609 operating on rocker 181 lifts pin 179 to clear the coins from the machine from the passages 177 and 178, returning them to the return coin cup 111.

If the purchaser has inserted a proper value of coins and goes through with the operation of pressing the proper button 151 corresponding to a package having the proper price, the following operations occur:

Button 151 is pushed and drives cams 355 into the tumblers 357 to lock out operation of all other buttons 151 and the button 152. At the same time, the rear end of the respective push bar 55 then rotates counterclockwise one of the levers 365 (Fig. 13) and the respective push pin 385 at the proper level pushes the proper selector bar 47, 49, 51 or 53. One of the selector switches D or E is then in the correct elevated position in view of the counting operations initiated by the coins. Hence switch D or E is closed by the laterally moved selector bar which results in the electric circuit being managed in one way or another as shown for example in Fig. 37 or 38 and as already made clear.

It will be observed from Figs. 37 and 38 that, whether selector switch D or E has been operated, the result is the same so far as the package delivery motor J is concerned. The motor starts, closing switch I, and continues to run through a complete cycle. This results in operating the shaft 515 to permit drawing back of the plate 435 which permits the respective flap 427 to fall back to the dotted line position shown in Fig. 3, but all other flaps are held by the fingers 661 which are locked against movement. Thus the uppermost package drops out through the trough 141 to the package cup 121. The motor J goes through a complete cycle even though the customer releases the button 151. In other words, the motor J is self-energized as long as switch I is held shut for the desired cycle of movement by the cam 35 which has the gear reduction connection 463 with the motor J.

Just after the purchased package falls clear of the opening 431, the package delivery mechanism operates to move the elevator 473 to flip up a package vertically past the spring 429 into position 501 at which time the flap 427 has returned so that the package may not follow out after the purchased package, but remains in visible position under the window 145. This also has the effect that after a purchaser has bought the last package, no further package flips into position, and a purchaser is automatically advised not to insert money for a package when none is there.

If the deposit price is too much by 5¢, with respect to the particular button 151 pushed, the 5¢ change coil H is energized by the selector switch E, as shown in Fig. 38, which releases one of the supply of the nickels in the passage 109.

Either of the selector switches D or E when closed energizes the lock bar coil G to release it to close the lock bar switch A which starts the motor J, but only the selector switch E will energize the 5¢ change coil H. In other words, the lock bar coil G, when the proper deposit is inserted, or 5¢ more than this proper amount (but not in excess of 5¢ more) will always operate through the switch A the package delivery motor J. If the amount is correct it is the selector switch D which is operated, and if the amount is in excess by 5¢ it is the selector switch E which is operated, but in the latter case when selector switch E is operated, coil H is operated. If selector switches D and E are not run up high enough, or too high, the package delivery motor J is not operated, upon pushing a button 151, because no selector switch is then in the path of any selector bar 47, 49, 51 or 53.

If no selector switch is in position to be operated, operation of the machine degenerates into the mere operation of the coin motor C to effect proper positioning of the coins upon the shelf 163 for manual return down the chute 177 or 178.

On the other hand, if either of the switches D or E is in proper position to be operated by the proper button 151, then operation of the package delivery motor J is assured, with or without 5¢ change delivery. This is done by energization of coil G.

If the price of a package is according to some odd penny multiple, then by reason of the proper presetting of the cams 577 and follower 575, the proper slide 559, 561, 563 or 565 is automatically operated to cause the knock-out bars 523 to send back the proper penny change along with any 5¢ change that goes into the cup 111. This requires insertion of an amount in excess of the cost price. This penny change operation occurs during the full cycle actuation of the package delivery motor J in connection with the chain drive 505. Furthermore this drive through the pinion 517 causes the match delivery mechanism shown in Fig. 5 to go through a third of a cycle and to pull out a single book of matches from one match column.

After the customer has pushed in a button 151, he can only release it. He cannot pull it out again, since it is locked in until the machine has gone through its cycle of operations to release it to be sprung forward. This is due to the condition shown in Fig. 15, where the struck-up lug 395 on lock bar 19 prevents return until the lock bar has been pulled back by the cam 605. Since the cam 605 pushes the pin 607 near the end of operation of the package delivery motor J, the respective button 151 does not come out until about the last thing in the operating cycle, while the package is delivered almost at the first. This means that the customer cannot push any other button (including 152) to perform any jamming operations for purposes of fraud while the machine operates. Also, since he receives his package promptly he is not tempted to perform any manipulations to hurry the machine.

Disregarding penny change, which is in addition to any nickel change, we have the following possibilities:

A 10¢ article may be purchased with two nickels or one dime, without change in each case. It may be purchased with three nickels or one dime and one nickel, with 5¢ change in each case.

A 15¢ article may be purchased with three nickels or one dime and one nickel, without change in each case. It may be purchased with four nickels or two dimes or two nickels and one dime, with 5¢ change in each case.

A 20¢ article may be purchased with four nickels, two nickels and one dime, or two dimes, without change in each case. Or it may be purchased with five nickels, two dimes and one nickel, one dime and three nickels, with 5¢ change in each case.

A 25¢ article may be purchased with five nickels, two dimes and one nickel, three nickels and one dime, without change in each case. It may be purchased with six nickels, three dimes, two dimes and two nickels, or one dime and four nickels, with 5¢ change in each case.

It is not possible to obtain change from the machine in amounts more than 9¢ but this is more than is usual in vending machines.

Suitable directions for maximum amounts to be deposited may be attached at the respective windows, in default of which all of the money will be stated to be returned. The machine will not accept any coin larger than a nickel in physical size. That is, the slot 125 or the substituted slug rejector will not accept quarters, and the like. The machine will accept up to a 30¢ deposit in accordance with the above rules, but with 5¢ change necessary at 30¢. This means that the maximum price of delivered articles is 25¢.

However, it will be understood that the functions of the machine may be extended, as far as purchase price is concerned, by multiplying the number of selector bars 47, 49, 51, 53 and package compartments 147 and associated parts.

The machine may be made to supply more than 5¢ change but less than 10¢ in terms of one nickel, plus a number of pennies less than five, as follows:

For example, assume that the push button 151 of the 10¢ column is arranged with a pin 385 so that pin, instead of being on what normally would be the 10¢ selector bar 47, is adjusted to operate upon the 15¢ selector bar 49. Also assume that the 10¢ package column is loaded with packages selling for 11¢. If 15¢ is introduced, the selector switch D will be run up opposite 15¢ selector bar 49. The customer then pushes the button 151 corresponding to the selector bar 49, which results in delivering the package, but without delivery of 5¢ change. This is because selector change switch E is inoperative. However, the customer is entitled to 4¢ change, which is obtained by predetermined setting of the cam 577 and the follower 575 over the respective supply column, so that 4¢ change will be ejected when the button 151 is pushed. It will be understood that in this case, adjustment of the cam 577 and the follower 575 amounts to complete removal of both. If other amounts of penny change are to be given for say 12¢, 13¢ or 14¢ purchases, this may likewise be managed by making the proper adjustments at the respective cam 577 and follower 575. If 20¢ is introduced, the selector switches D and E run up one more step so that switch E is closed by selector bar 49. This results in delivery of 5¢ change plus the 4¢ already described, making 9¢ change, or any other number of pennies less than four, as predetermined.

*Alternative wiring diagram (Figs. 43 and 44)*

It is sometimes desirable that the change making coil H operate subsequently to the operation of the lock bar 19. The circuit of Figs. 43 and 44 accomplishes this. In this circuit, similar reference characters indicate corresponding parts.

Figure 43:
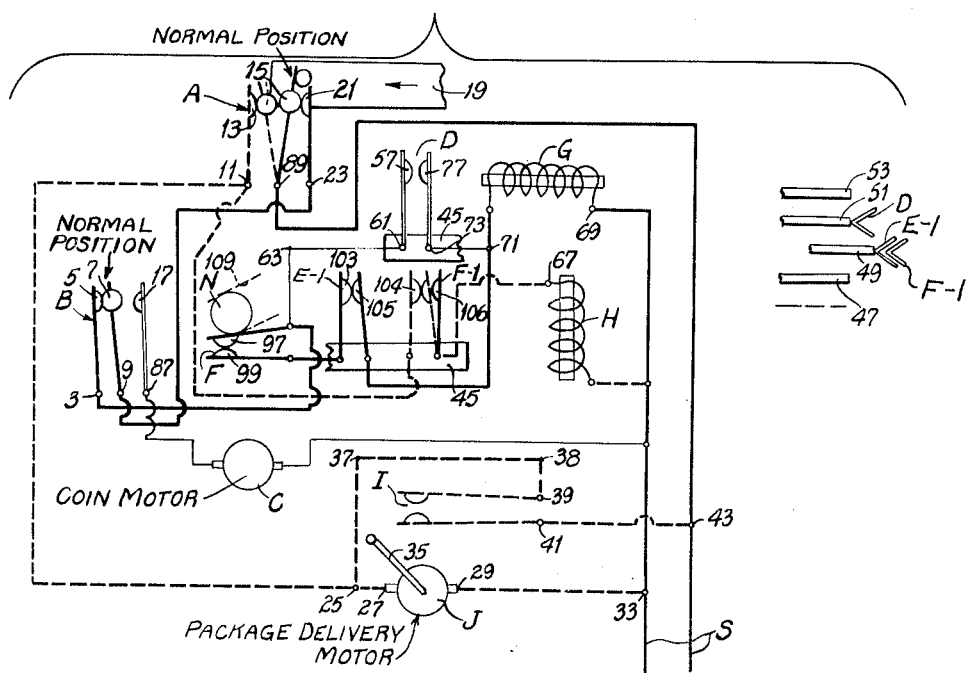
Fig. 43 is a wiring diagram similar to the conditions of Fig. 38 but showing an alternative scheme; and, Fig. 44 is a detail of a switch used in Fig. 43.

The switch F—1 is in a tandem switch unit E—1, F—1. E—1 may be referred to as another delivery selector switch in parallel with the delivery selector switch D. Thus there are two components of this switch D in this modification. Switch D is a single-pole, single-throw switch, as shown. The contacts of switch D of Fig. 38 that are retained in Fig. 43 are 57 and 77. Fig. 43 is intended to show a condition wherein a 20¢ deposit is made for a 15¢ package, requiring 5¢ change.

Operation is as follows:

The coins pass through the coin tester and coin counter (not shown in Fig. 43) and cause four reciprocations of the reciprocating bar 323, thus running up the escapement bar 45 to the position indicated diagrammatically at the right in Fig. 43.

Figure 44:
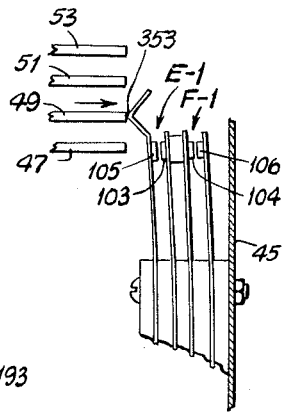

In Fig. 44, the run-up position of 45 is shown (which carries E—1 and F—1) but in this Fig. 44 the corresponding selector bar 49 has not yet been operated as in Fig. 43. This places selector switch D (now having contacts 57 and 77 only) in a position where they are not operated. However, change selector switches E—1 and F—1 are positioned where they will become closed by the purchaser's operation of the proper selector bar 49 (see the right-hand portion of Fig. 43).

In Fig. 44 is shown the fact that switch E—1 will close first and then F—1. Switch E—1 results only in operation of lock bar coil G. Switch F—1 later operates only coil H. Current feeds first from the main circuit S through the lock bar switch A (contacts 15, 21), points 23, 9, contacts 7, 5 of switch B, through the contacts 97 and 99 of switch F. The coin switch F is at this time closed because a coin rests upon it in the coin change supply in the chute 109. Then the current goes through contacts 105 and 103 of the switch E—1 and back to the circuit S via the coil G. This throws the lock bar from the position of Fig. 13 to that shown in Fig. 15. The lock bar changes the connections in switch A to the dotted-line circuit shown in Fig. 43 so that current is then fed through contacts 15 and 13, from whence it passes through the switch F—1, and then through the coin change coil H, and then back to the circuit S. which releases 5¢ in change. Thus coil H is energized not until the lock bar switch A has operated. Contacts 15 and 21 will not reclose until the machine has gone through its cycle of action as determined by the motor J, which is fed first over the dotted circuit 89, 15, 13, 11. 25. 27. 29 and 33. and when switch I has closed by cam 35, by circuit 43, 41, I, 39, 38, 37, 25, 27, J, 29, 33.

When D is opposite a movable selector bar, and closed, as when no change making is required, the initial circuit is 89, 15, 21, 23, 9, 7, 5, 3, 63, 61, 57, 77, 71, G. and 69 for energizing G to operate A. This circuit is independent of switch F.

An advantage of the alternative circuit is that the lock bar must positively be returned to set switch A back to closing of contacts 15 and 21 before a second nickel change can be obtained. By the time that 15 and 21 reclose, the circuit through H will have re-opened at F—1. This is a certain and positive bar against obtaining extra change.

*Advantages*

The machine has a great capacity for packages, change, matches, all in a very compact space, requiring little head room, since all package delivery is from below. The machine is about 50 inches high. Furthermore, the matches and pennies are laid in horizontal planes (instead of in vertical planes) and are in parallel columns. There is practically no waste space within the console case. It will carry $13.50 worth of pennies, 375 match books and 400 cigarette packages.

It is unlikely that fraud can be perpetrated, due to the interlocks.

The actual article to be obtained is in full view along with attached revenue stamps and trademark and it automatically indicates when it is empty as to any particular brand.

It is highly adapted by simple adjustments to a wide price range according to the brands accommodated and the taxes required.

The machine is quite light in weight.

Only enough 5¢ pieces are by-passed into the change chute 109 to keep it full, but without making all of the nickels in the apparatus available for change, so that should some kind of a fraud occur, all of the nickels theretofore deposited cannot be drained from the machine.

The penny changer is very uncritical as to damaged coins and will deliver as change deformed pennies as well as perfect pennies.

It is to be understood that in the present description the terms penny and 1¢ piece are analogous; the terms nickel and 5¢ piece are analogous; the terms dime and 10¢ piece are analogous; and the terms quarter and 25¢ piece are analogous.

Complying with rule 43 of the Rules of Practice, attention is hereby called to copending divisional applications filed by applicant, which are as follows: Serial No. 546,779, filed July 27, 1944, for Vending machine, and Serial No. 556,540, filed September 30, 1944, for Vending machine. The former of these refers to means to deliver match units or packages; and the latter refers to article magazine and delivery means.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. In a vending machine, movable selector bars, electrically driven delivery means, a switch, means for moving the switch to energize the delivery means comprising a coil and supply circuit therefor, and a selector switch in the coil supply circuit, means for moving the selector switch into apposition with respect to one of said selector bars for operation only by that bar when the respective bar is moved, whereby said operating coil is energized to cause closure of said first switch to operate said delivery means.

2. In a vending machine, movable selector bars, electrically driven delivery means, a main switch for the delivery means, an auxiliary switch for the delivery means closed by operation of said delivery means until the end of the cycle of operation of the delivery means, means for moving the main switch to initiate energization of the delivery means comprising an operating coil and supply circuit therefor, and a selector switch in the coil supply circuit movable into apposition with respect to one of said selector bars for closure only when the respective bar is moved to energize the coil to cause closure of said main switch to initiate operation of said delivery means.

3. In a vending machine, individually movable selector bars, electrically driven package delivery means, a main switch for the delivery means, means for moving the main switch to energize the delivery means comprising an operating coil and supply circuit therefor, a delivery selector switch in the coil supply circuit movable into apposition with respect to one of said selector bars for closure only when the respective bar is moved to energize the coil to cause closure of said main switch to initiate operation of said package delivery means, means forming a coin supply compartment, coin return delivery means connected thereto, means for releasing coins from the coin supply compartment to the coin return delivery means comprising a coin release coil and a supply circuit therefor, a coin selector switch movable with the delivery selector switch into apposition with respect to said selector bars and operable to be closed only by one of said bars when the coin selector switch is in proper position and being adapted when closed to energize said coin release coil through its circuit to make change.

4. In a vending machine, individually movable selector bars, electrically driven package delivery means, a main switch for the delivery means, an auxiliary switch for the package delivery means closed by operation of said delivery means until the end of the cycle of operation of the delivery means, means for moving the main switch to initiate energization of the delivery means comprising an operating coil and supply circuit therefor, a delivery selector switch in the coil supply circuit movable into apposition with respect to one of said selector bars for closure only when the respective bar is moved to energize the coil to cause closure of said main switch to initiate operation of said package delivery means, means forming a coin supply compartment, coin return delivery means connected thereto, means for releasing coins from the coin supply compartment to the coin return delivery means comprising a coin release coil and a supply circuit therefor, a coin selector switch movable with the delivery selector switch into apposition with respect to said selector bars and operable to be closed only by one of said bars when in proper position, the coin selector switch being adapted when closed to energize said coin release coil through its circuit to make change.

5. In a vending machine, individually movable selector bars, electrically driven package delivery means, a main switch for the delivery means, means for moving the main switch to initiate energization of the delivery means comprising an operating coil and supply circuit therefor, a delivery selector switch in the coil supply circuit movable into apposition with respect to one of said selector bars for closure only when the respective bar is moved to energize the coil to cause closure of said main switch to initiate operation of said package delivery means, means forming a coin supply compartment, coin return delivery means connected thereto, means for releasing coins from the coin supply compartment to the coin return delivery means comprising a coin release coil and a supply circuit therefor, a coin selector switch movable with the delivery selector switch into apposition with respect to said selector bars and operable to be closed only by one of them when in proper position, and being adapted when closed to energize said coin release coil through its circuit, and an interlock means for determining operation of one at a time only of said selector bars.

6. In a vending machine, individually movable selector bars, electrically driven package delivery means, a main switch for the delivery means, means for moving the main switch to energize the delivery means comprising an operating coil and supply circuit therefor, a delivery selector switch in the coil supply circuit movable into apposition with respect to one of said selector bars for closure when the respective bar is moved to energize the coil to cause closure of said main switch to operate said package delivery means, means of receiving inserted coins, and means connected with the coin receiving means adapted automatically to be set into motion in response to actions of various coins inserted into the machine for setting said selector switch in apposition with respect to one or another of said selector bars.

7. In a vending machine, individually movable selector bars, electrically driven package delivery means, a main switch for the delivery means, means for moving the main switch to initiate energization of the delivery means comprising an operating coil and supply circuit therefor, a delivery selector switch in the coil supply circuit movable into apposition with respect to one of said selector bars for closure when the respective bar is moved to energize the coil to cause closure of said main switch to operate said package delivery means, means forming a coin supply compartment, coin return delivery means connected thereto, means for releasing coins from the coin supply compartment to the coin delivery means comprising a coin release coil and a supply circuit therefor, a coin selector switch movable into apposition with respect to said selector bars and operable to be closed by one of them when in proper position, and being adapted when closed to energize said coin release coil through its circuit, means for receiving inserted coins, and means connected with the coin receiving means adapted automatically to be set into motion in response to actions of various coins inserted into the machine for setting both of said selector switches with respect to said selector bars.

8. In a vending machine, individually movable selector bars, electrically driven package delivery means, a main switch for the delivery means, means for moving the main switch to energize the delivery means comprising an operating coil and supply circuit therefor, a delivery selector switch in the coil supply circuit movable into apposition with respect to one of said selector bars for closure when the respective bar is moved to energize the coil to cause closure of said main switch to operate said package delivery means, means forming a coin supply compartment, coin return delivery means connected thereto, means for releasing coins from the coin supply compartment to the coin delivery means comprising a coin release coil and a supply circuit therefor, a coin selector switch movable into apposition with respect to said selector bars and operable to be closed by one of them when in proper position and being adapted when closed to energize said coin release coil through its circuit, interlock means for determining operation of one at a time only of said selector bars, means for receiving inserted coins, and means connected with the coin receiving means adapted automatically to be set into motion in response to actions of various coins inserted into the machine for setting said selector switches in respect to said selector bars.

9. In a vending machine, individually movable selector bars, electrically driven package delivery means, a main switch for the delivery means, means for moving the main switch to energize the delivery means comprising an operating coil and supply circuit therefor, a delivery selector switch in the coil supply circuit movable into apposition with respect to one of said selector bars for closure when the respective bar is moved to energize the coil to cause closure of said main switch to initiate operation of said package delivery means, means for receiving inserted coins, means connected with the coin receiving means adapted automatically to be set into motion in response to actions of various coins inserted into the machine for setting said selector switch in apposition with respect to said selector bars, comprising biasing means for moving the selector switch, an escapement releasing the biasing means step by step, a coin motor, means for setting said motor into operation by inserting a coin, said coin motor driving coins into operating engagement with respect to the escapement means.

10. In a vending machine, individually movable selector bars, electrically driven package delivery means, a main switch for the delivery means, an auxiliary switch for the package delivery means closed by operation of said delivery means until the end of the cycle of operation thereof, means for moving the main switch to initiate energization of the delivery means comprising an operating coil and supply circuit therefor, a delivery selector switch in the coil supply circuit movable into apposition with respect to one of said selector bars for closure when the respective bar is moved to energize the coil to cause closure of said main switch to initiate operation of said package delivery means, means for receiving inserted coins, means connected with the coin receiving means adapted automatically to be set into motion in response to actions of various coins inserted into the machine for setting said selector switch in apposition with respect to said selector bars, comprising biasing means for moving the selector switch, an escapement releasing the biasing means step by step, a coin motor means for setting said motor into operation by inserting a coin, said coin motor driving coins into operating engagement with respect to the escapement means, and means for returning the biasing means to starting position as the package delivery means completes a cycle.

11. In a vending machine, individually movable selector bars, electrically driven package delivery means, a main switch for the delivery means, means for moving the main switch to energize the delivery means comprising an operating coil and supply circuit therefor, a delivery selector switch in the coil supply circuit movable into apposition with respect to one of said selector bars for closure only when the respective bar is moved, to energize the coil to cause operation of said main switch to initiate operation of said package delivery means, means forming a coin supply compartment, coin return delivery means connected thereto, means for releasing coins from the coin supply compartment to the coin delivery means comprising a coin release coil and a supply circuit therefor, a coin selector switch also movable into apposition with respect to said selector bars and operable to be closed only by one of said bars when the coin selector switch is in proper position, and being adapted when closed to energize said coin release coil through its circuit to make change, the supply circuit for the coin selector switch being closed by operation of the main switch.

12. In a vending machine, individually movable selector bars, electrically driven package delivery means, a main switch for the delivery means, means for moving the main switch to energize the delivery means comprising an operating coil and supply circuit therefor, delivery selector switch means having two components in parallel in the coil supply circuit movable into apposition with respect to one of said selector bars for closure alternatively only when a given bar is moved, to energize the coil to cause operation of said main switch to initiate operation of said package delivery means, means forming a coin supply compartment, coin return delivery means connected thereto, means for releasing coins from the coin supply compartment to the coin delivery means comprising a coin release coil and a supply circuit therefor, a coin selector switch also movable into apposition with respect to said selector bars and operable to be closed only by one of said bars when the coin selector switch is in proper position, and being adapted when closed to energize said coin release coil through its circuit to make change, one component of the delivery selector switch means being operable in tandem with the coin selector switch to close ahead of the coin selector switch upon movement of the respective selector bar.

13. In a vending machine, individually movable selector bars, electrically driven package delivery means, a main switch for the delivery means, means for moving the main switch to energize the delivery means comprising an operating coil and supply circuit therefor, a delivery selector switch in the coil supply circuit movable into apposition with respect to one of said selector bars for closure when the respective bar is moved to energize the coil to cause closure of said main switch to initiate operation of said package delivery means, means forming a coin supply compartment, coin return delivery means connected thereto, means for releasing coins from the coin supply compartment to the coin delivery means comprising a release coil and a supply circuit therefor, said coil supply circuits being in parallel, a coin selector switch movable into apposition with respect to said selector bars and operable to be closed by one of them when in proper position, and being adapted when closed to energize said coin release coil through its circuit, a switch in the circuit of said coin selector switch adapted to close in response to a coin in said compartment and to open in the absence of said coin.

14. In a vending machine, means forming a coin supply compartment, coin return delivery means connected thereto, individually movable selector bars, means for releasing coins from the coin supply compartment to the coin delivery means comprising a coin release coil and a supply circuit therefor, a coin selector switch movable into apposition with respect to said selector bars and operable to be closed by one of them when in proper position, and being adapted when closed to energize said coin release coil through its circuit.

15. In a vending machine, means forming a coin supply compartment, coin return delivery means connected thereto, individually movable selector bars, means for releasing coins from the coin supply compartment to the coin delivery means comprising a coin release coil and a supply circuit therefor, a coin selector switch movable into apposition with respect to said selector bars and operable to be closed by one of them when in proper position, and being adapted when closed to energize said coin release coil through its circuit, a switch in the circuit of said coin selector switch adapted to close in response to a coin in said compartment and to open in the absence of said coin.

16. In a vending machine, individually movable selector bars, electrically driven package delivery means, a switch for the delivery means, means for moving the switch to energize the delivery means comprising an operating coil and supply circuit therefor, means forming a coin supply compartment, coin return delivery means connected thereto, means for releasing coins from the coin supply compartment to the coin delivery means comprising a coin release coil and a supply circuit therefor, said coil supply circuits being in parallel, a coin selector switch movable into apposition with respect to said selector bars and operable to be closed by one of them when in proper position, and being adapted when closed to energize said coin release coil through its circuit, a coin switch adjacent the coin compartment and responsive to any coin therein to close and being in the circuit of the coin selector switch and the coin release coil, said coin selector switch being open in the absence of coin in said compartment.

17. In a vending machine, individually movable selector bars, electrically driven package delivery means, a switch for the delivery means, means for moving the switch to energize the delivery means comprising an operating coil and supply circuit therefor, a delivery selector switch in the coil supply circuit movable into apposition with respect to one of said selector bars for closure when the respective bar is moved to energize the coil to cause closure of said main switch to operate said package delivery means, means forming a coin supply compartment, coin return delivery means connected thereto, means for releasing coins from the coin supply compartment to the coin delivery means comprising a coin release coil and a supply circuit therefor, a coin selector switch movable into apposition with respect to said selector bars and operable to be closed by one of them when in proper position, and being adapted when closed to energize said coin release coil through its circuit, means for receiving inserted coins, coin driving means associated therewith, a coin driving motor for said coin driving means, a circuit therefor, a double-throw switch in the coin driving motor circuit normally open with respect to the motor circuit and closed with respect to said circuit through the delivery selector switch, and means whereby said coin motor switch is temporarily opened with respect to said delivery selector switch and closed with respect to the coin motor circuit upon insertion of a coin.

18. In a vending machine, individually movable selector bars, electrically driven package delivery means, a switch for the delivery means, means for moving the switch to energize the delivery means comprising an operating coil and supply circuit therefor, a delivery selector switch in the coil supply circuit movable into apposition with respect to one of said selector bars for closure when the respective bar is moved to energize the coil to cause closure of said main switch to operate said package delivery means, means forming a coin supply compartment, coin return delivery means connected thereto, means for releasing coins from the coin supply compartment to the coin delivery means comprising a coin release coil and a supply circuit therefor, a coin selector switch movable into apposition with respect to said selector bars and operable to be closed by one of them when in proper position, and being adapted when closed to energize said coin release coil through its circuit, means for receiving inserted coins, coin driving means associated therewith, a coin driving motor for said coin driving means, a circuit therefor, a double-throw switch in the coin driving motor circuit normally open with respect to the coin motor circuit and closed with respect to said circuit through the delivery selector switch, and means whereby said coin motor switch is temporarily opened with respect to said delivery selector switch and closed with respect to the coin motor circuit, movable means carrying said selector switches and normally biased toward apposition of the switches in respect to said selector bars, and escapement means responsive to coins which are driven by said motor to release the biased selector switch for movement in the direction of its bias.

19. In a vending machine, individually movable selector bars, electrically driven package delivery means, a main switch for the delivery means, means for moving the main switch to energize the delivery means comprising an operating coil and supply circuit therefor, delivery selector switches in the coil supply circuit movable into apposition with respect to one of said selector bars for closure only when the respective bar is moved to energize the coil to cause closure of said main switch to initiate operation of said package delivery means, means forming a coin supply compartment, coin return delivery means connected thereto, means for releasing coins from the coin supply compartment to the coin delivery means comprising a coin release coil and a supply circuit therefor, a coin selector switch also movable with said delivery selector switches into apposition with respect to said selector bars and operable to be closed only by one of said bars when the coin selector switch is in proper position and being adapted when closed to energize said coin release coil through its circuit to make change.

20. In a vending machine, individually movable selector bars, electrically driven package delivery means, a main switch for the delivery means, means for moving the main switch to energize the delivery means comprising an operating coil and supply circuit therefor, delivery selector switches in the coil supply circuit movable into apposition with respect to one of said selector bars for closure only when the respective bar is moved to energize the coil to cause closure of said main switch to initiate operation of said package delivery means, means forming a coin supply compartment, coin return delivery means connected thereto, means for releasing coins from the coin suppply compartment to the coin delivery means comprising a coin release coil and a supply circuit therefor, a coin selector switch also movable into apposition with respect to said selector bars and operable to be closed only by one of said bars when the coin selector switch is in proper position and being adapted when closed to energize said coin release coil through its circuit to make change, a switch in the circuit of said one delivery selector switch and coin selector switch adapted to close in response to a coin in said compartment and to open in the absence of said coin.

21. In a vending machine, movable selector bars, electrically driven package delivery means, a main switch, means for moving the main switch to energize the delivery means comprising a coil and supply circuit therefor and a selector switch in the supply circuit, means for moving the selector switch into apposition with respect to one of said selector bars for operation only by that bar when the respective bar is moved whereby said operating coil is energized to cause closure of said main switch to operate said package delivery means, means forming a coin supply compartment, a switch in the circuit of said delivery selector switch adapted to close in response to a coin in said compartment and to open in the absence of said coin.

22. In a vending machine, movable selector bars, electrically driven package delivery means, a main switch, means for moving the main switch to energize the delivery means comprising a coil and supply circuit therefor and a pair of selector switches in parallel in the supply circuit for said coil, means for moving the selector switches into apposition with respect to said selector bars for operation individually by the bars, said operating coil being energized to cause closure of said main switch to operate said package delivery means, means forming a coin supply compartment, and a switch in the circuit of one only of said delivery selector switches adapted to close in response to a coin in said compartment and to open in the absence of said coin.

23. In a vending machine, movable selector bars, electrically driven package delivery means, a main switch, means for moving the main switch to energize the delivery means comprising a coil and supply circuit therefor and a pair of selector switches in parallel in the supply circuit for said coil, means for moving the selector switches into apposition with respect to said selector bars for operation individually by the bars, said operating coil being energized to cause closure of said main switch to operate said package delivery means, means forming a coin supply compartment, coin return delivery means connected therewith a switch in the circuit of one only of said delivery selector switches adapted to close in response to a coin in said compartment and to open in the absence of said coin, and a circuit operable to release coins from the coin supply compartment only after said main switch has operated.

24. In a vending machine, switch-operating selector bars, means for individually operating said selector bars, at least one switch biased for movement toward apposition with respect to said selector bars, escapement means resisting the bias, and coin responsive means for operating the escapement to release the switch for biased movement.

25. In a vending machine, switch-operating selector bars, means for individually operating said selector bars, at least two switches biased for movement toward apposition with respect to said selector bars, escapement means resisting the bias, and coin responsive means for operating the escapement to release the switches for biased movement toward placing one or another of said switches opposite any given bar.

26. In a vending machine, switch-operating selector bars, means for individually operating said selector bars, three switches biased for movement toward apposition with respect to said selector bars, escapement means resisting the bias, and coin responsive means for operating the escapement to release the switches for biased movement, two of said switches being positioned for operation sequentially by one bar and another of said switches being operable alternatively with respect to operation of said two switches.

27. In a vending machine, switch-operating selector bars, means for individually operating said selector bars, at least one switch biased for movement toward apposition with respect to said selector bars, escapement means resisting the bias, coin responsive means for operating the escapement to release the switch for biased movement, and release means associated with the escapement permitting direct return of the switch against its bias without escapement action during said return.

28. In a vending machine, a switch, a biased switch supporting member, individually operable selector bars spaced at predetermined intervals and selectively cooperating with the switch in various positions of the latter, escapement notches on the switch supporting member arranged for escape motions thereof equal in distances respectively to the spacings between selector bars, said switch supporting member being adapted in its escaped positions to hold the switch opposite one or another of said selector bars for operation thereby, escapement means, fingers extending from said escapement means and spaced with respect to the notched portions to permit movement of the supporting member a distance equal to the distance between said selector bars upon one cycle movement of the escapement means, means for driving coins, and means associated with the escapement means responsive to movement of different coins to move the escapement cyclically a number of times in accordance with the differences in the coins.

29. In a vending machine, a switch, a biased switch supporting member, individually operable selector bars spaced at predetermined intervals and selectively cooperating with the switch in various positions of the latter, an escapement, means on said escapement cooperating with the switch supporting means to permit its movement a distance equal to the distance between said selector bars upon one cycle movement of the escapement, positions assumed by the switch supporting means between escapements being adapted to place said switch opposite one or another of said selector bars for operation thereby, means for driving coins, and means associated with the escapement means responsive to movement of different coins to move the escapement cyclically a number of times in accordance with the differences in the coins.

30. In a vending machine, a biased switch supporting member, individually operable selector bars spaced at predetermined intervals, escapement notches on the switch supporting member, escapement means, fingers extending from said escapement means and spaced with respect to the notches to permit upon one cycle movement of the escapement means movement of the supporting member a distance equal to the distance between said selector bars, and means mounting said fingers whereby said fingers function as anchors for said switch supporting member in response to said bias but permitting said fingers to bias from anchoring position in response to return movement of the switch supporting member.

31. A change maker for vending machines and the like comprising means for holding a plurality of change stacks, means for biasing said stacks from one end, means for holding each at the other end for pushing out an endmost coin, plungers respectively reciprocating crosswise of the stacks adjacent said coins at the last-named ends, means mounting each plunger for lateral movement in addition to reciprocating movement such that each plunger during reciprocation may either pass the respective endmost coin or remove it, means normally biasing the plungers to removing positions, and means for selectively moving all of the plungers or any number less than all against their bias and into coin passing positions upon reciprocation.

32. A change maker for vending machines and the like comprising means for holding a plurality of change stacks, means for biasing said stacks from one end, means for holding them at the other end so as to hold an endmost coin in each stack exposed for pushing out, plungers respectively reciprocating crosswise of the stacks adjacent said exposed coins, said plungers reciprocating in phase, means mounting each plunger for lateral movement in addition to reciprocating movement, such that each plunger during reciprocation may either pass the respective endmost coin or remove it, means normally biasing the plungers to removing positions, and means for selectively moving all of the plungers or any number less than all against their bias and into coin passing positions upon reciprocation.

33. A change maker for vending machines and the like comprising means for holding a plurality of change stacks, means for biasing said stacks from one end, means for holding each at the other end in position exposed for pushing out an endmost coin, plungers respectively reciprocating crosswise of the stacks adjacent said coins at the ends, means mounting each plunger for lateral movement in addition to reciprocating movement such that each plunger during reciprocation may either pass the respective endmost coin or remove it, means normally biasing the plungers to removing positions, means for selectively moving all of the plungers or any number less than all against their bias and into coin passing positions upon reciprocation, said means for selective movement comprising a number of bars equal to the number of coin stacks, respective bars controlling predetermined groups of plungers for coin removal, push rods, cams on the push rods, and one or more followers on each bar cooperating respectively with one or more of said cams, said cams and followers being adjustably related on said bars and plungers.

34. A change maker for vending machines and the like comprising means for holding a plurality of change stacks, means for biasing said stacks from one end, means for holding each at the other end in position exposed for pushing out an endmost coin, plungers respectively reciprocating crosswise of the stacks adjacent said coins at the ends, means mounting each plunger for lateral movement in addition to reciprocating movement such that each plunger during reciprocation may either pass the respective endmost coin or remove it, means normally biasing the plungers to removing positions, means for selectively moving all of the plungers or any number less than all against their bias and into coin passing positions upon reciprocation, said means for selective movement comprising a number of bars equal to the number of coin stacks, respective bars controlling predetermined groups of plungers for coin removal, push rods, cams on the push rods, one or more followers on each bar cooperating respectively with one or more of said cams, said cams and followers being adjustably related on said bars and plungers, and interlock means between the plungers whereby one only may be operated at a time.

35. In a vending machine, individually movable selector bars, electrically driven package delivery means, a main switch for the package delivery means, a biased lock bar for closing the main switch, an operating coil for releasing said biased lock bar and a supply circuit for the coil, a delivery selector switch in the coil supply circuit movable into apposition with respect to one of said selector bars for closure when the respective selector bar is moved, push means for operating a selector bar, interlock means between the push means whereby only one selector bar may be operated at a time, said bar operating said selector switch only if the switch is opposite the bar, escapement means, mechanism for receiving and driving coins, and means operated by driven coins and cooperating with the escapement means to effect movement of said selector switch to a point opposite the movable selector bar.

36. In a vending machine, individually movable selector bars, electrically driven package delivery means, a main switch for the package delivery means, a biased lock bar for closing the main switch, an operating coil for releasing said biased lock bar and a supply circuit for the coil, a delivery selector switch in the coil supply circuit movable into apposition with respect to one of said selector bars for closure when the respective selector bar is moved, push means for operating a selector bar, interlock means between the push means whereby only one selector bar may be operated at a time, said bar operating said selector switch only if the switch is opposite the bar, escapement means, mechanism for receiving and driving coins, and means operated by driven coins and cooperating with the escapement means to effect movement of said selector switch to a point opposite the movable selector bar, means whereby the biased movement of the lock bar locks in the operated push means and retains it, and means responsive to a complete cycle of operation of the package delivery means for returning said lock bar to release said push means.

37. In a vending machine, individually movable selector bars, electrically driven package delivery means, a main switch for the delivery means, an auxiliary switch for the package delivery means closed by operation of said delivery means until the end of the cycle of operation thereof, a biased lock bar for closing the main switch, an operating coil for releasing said biased lock bar and a supply circuit for the coil, a delivery selector switch in the coil supply circuit movable into apposition with respect to one of said selector bars for closure when the respective selector bar is moved, push means for operating a selector bar, interlock means between the push means whereby only one selector bar may be operated at a time, said bar operating said selector switch only if the switch is opposite the bar, escapement means, mechanism for receiving and driving coins, and means operated by driven coins and cooperating with the escapement means to effect movement of said selector switch opposite the movable selector bar. means whereby the bias movement of the lock bar locks in the operated push means and retains it, and means responsive to a complete cycle of operation of the package delivery means for returning said lock bar to release said push means.

38. In a vending machine, individually movable selector bars, electrically driven package delivery means, a main switch for the delivery means, an auxiliary switch for the package delivery means closed by operation of said delivery means until the end of the cycle of operation thereof, a biased lock bar for closing the main switch, an operating coil for releasing said biased lock bar and a supply circuit for the coil, a delivery selector switch in the coil supply circuit movable into apposition with respect to one of said selector bars for closure when a selector bar is moved, push means for operating a selector bar, interlock means between the push means whereby only one selector bar may be operated, said bar operating said selector switch only if the switch is opposite the bar, escapement means, mechanism for receiving and driving coins, and means operated by driven coins and cooperating with the escapement means to effect movement of said selector switch opposite the movable selector bar, means whereby the bias movement of the lock bar locks in the operated push means and retains it, means responsive to a complete cycle of operation of the package delivery means for returning said lock bar to release said push means, and means also responsive to completion of said cycle of operation to return the escapement means to starting position.

39. In a vending machine, individually movable selector bars, electrically driven package delivery means, a main switch for the delivery means, a biased lock bar for closing the main switch, an operating coil for releasing said biased lock bar and a supply circuit for the coil, a delivery selector switch in the coil supply circuit movable into apposition with respect to one of said selector bars for closure when a bar is moved, push means for operating a selector bar, interlock means between the push means whereby only one selector bar may be operated, said bar operating said selector switch only if the switch is opposite the bar, escapement means, mechanism for receiving and driving coins, and means operated by driven coins and cooperating with the escapement means to effect movement of said selector switch opposite the movable selector bar, means responsive to a complete cycle of operation of the package delivery means for returning said lock bar, means also responsive to completion of said cycle of operation to return the escapement means to starting position, a compartment for holding a supply of change, and means responsive to said completion of cycle of operation for releasing from the change compartment a piece of change.

40. In a vending machine, means forming a coin supply channel, a horizontal column of coins in the channel, a pusher biasing said coins from one end of the column, means holding the column at the other end against bias and presenting the coins for removal from the column, and a cord passing from said biasing means beneath the coins to support them, said cord in turn being supported by the bottom of the channel and means for withdrawing the cord while supporting the coins as the coins are removed from the column.

41. In a vending machine, coin passages for coins, a coin driving motor, means responsive to insertion of coins temporarily to drive the motor positively to move the coins through the passages, means intercepting the passages to hold up coins, money return passages from said coin passages, blocking means adjacent said coin upholding means, means operable through a cycle of action to deliver a package from the machine, means connected with said package delivery means adapted near the end of the cycle to move the coin upholding means to coin releasing position and then to move the blocking means to coin release position and manual means for moving the blocking means to coin release position independently of the package delivery means.

42. In a vending machine, coin passages, a coin driving motor, means responsive to insertion of coins temporarily to drive the motor positively to move the coins through the passages, means intercepting the passages to hold up coins, money return passages from said coin passages, blocking means adjacent said coin upholding means, means operable through a cycle of action to deliver a package from the machine, means connected with said package delivery means adapted near the end of the cycle to move the coin upholding means to coin releasing position and manual means for moving the blocking means to coin release position independently of the package delivery means.

43. In a vending machine, coin passages, a coin driving motor, means responsive to insertion of coins temporarily to drive the motor positively to move the coins through the passages, means intercepting the passages to hold up coins, money return passages from said coin passages, blocking means adjacent said coin upholding means, means operable through a cycle of action to deliver a package from the machine, means connected with said package delivery means adapted near the end of the cycle to move the blocking means to coin release position and manual means for moving the blocking means to coin release position independently of the package delivery means.

44. In a vending machine, a coin passage, a coin driving motor, means responsive to insertion of a coin temporarily to drive the motor positively to move the coin through the passage, means intercepting the inlet passages to hold up the coin for a predetermined time, coin return passages from said coin inlet passage above the upholding means, blocking means adjacent said coin upholding means, means operable through a cycle of action to deliver a package from the machine, means forming a coin pocket beneath the coin upholding means and adapted to receive coins for change when less than full, and when full deflecting coins released from said upholding means.

45. In a vending machine, a plurality of selector bars, interlock means for moving one of said selector bars, a pair of switches movable into positions respectively to be moved by one of the selector bars, said switches being movable together one in advance of the other, whereby only one at a time may be operated by the movable selector bar.

BENJAMIN W. FRY.